US009552265B2

United States Patent
Saito et al.

(10) Patent No.: US 9,552,265 B2
(45) Date of Patent: Jan. 24, 2017

(54) INFORMATION PROCESSING APPARATUS AND STORAGE SYSTEM

(71) Applicant: FUJITSU LIMITED, Kawasaki-shi, Kanagawa (JP)

(72) Inventors: Takumi Saito, Nagoya (JP); Ryoko Masuda, Nagoya (JP); Hajime Kondo, Kawasaki (JP); Shinichi Nishizono, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 160 days.

(21) Appl. No.: 14/659,788

(22) Filed: Mar. 17, 2015

(65) Prior Publication Data

US 2015/0278049 A1  Oct. 1, 2015

(30) Foreign Application Priority Data

Mar. 28, 2014  (JP) .................. 2014-067394

(51) Int. Cl.
*G06F 11/07* (2006.01)
*G06F 11/20* (2006.01)
(Continued)

(52) U.S. Cl.
CPC ........... *G06F 11/2069* (2013.01); *G06F 3/067* (2013.01); *G06F 3/0617* (2013.01); *G06F 3/0635* (2013.01);
(Continued)

(58) Field of Classification Search
CPC ............ G06F 11/0727; G06F 11/1666; G06F 11/2069; G06F 11/2092; G06F 11/2094
(Continued)

(56) References Cited

U.S. PATENT DOCUMENTS 9,459,809 B1 * 10/2016 Chen ................. G06F 3/0644
2005/0071380 A1  3/2005 Micka et al.
(Continued)

FOREIGN PATENT DOCUMENTS

JP  2006-048676  2/2006
JP  2006-164080  6/2006
JP  2011-076130  4/2011

OTHER PUBLICATIONS

Extended European Search Report dated Jul. 23, 2015 for corresponding European Patent Application No. 15159178.1, 9 pages.

*Primary Examiner* — Chae Ko
(74) *Attorney, Agent, or Firm* — Fujitsu Patent Center

(57) ABSTRACT

There is provided an information processing apparatus including a control unit. The control unit adds type information indicating a first type in a first operation request in which operation target storage devices are specified by unique identifiers, respectively, used in a first storage apparatus and outputs the first operation request to the first storage apparatus through the network. When the control unit transmits the first operation request to a second storage apparatus and receives an error response indicating a type error from the second storage apparatus after transparent failover is executed, the control unit adds type information indicating the second type in a second operation request in which operation target storage devices are specified by unique identifiers, respectively, used in the second storage apparatus and outputs the second operation request to the second storage apparatus through the network.

5 Claims, 29 Drawing Sheets

(51) Int. Cl.
*G06F 3/06* (2006.01)
*G06F 11/14* (2006.01)

(52) U.S. Cl.
CPC ........... *G06F 11/1464* (2013.01); *G06F 11/20* (2013.01); *G06F 2201/84* (2013.01)

(58) Field of Classification Search
USPC ......................................................... 714/6.3
See application file for complete search history.

(56) References Cited

U.S. PATENT DOCUMENTS

| | | | |
|---|---|---|---|
| 2006/0031594 A1 | 2/2006 | Kodama | |
| 2006/0129772 A1 | 6/2006 | Kawamura et al. | |
| 2006/0179170 A1 | 8/2006 | Kodama | |
| 2011/0078396 A1 | 3/2011 | Hiraiwa et al. | |
| 2013/0159768 A1* | 6/2013 | McKay | G06F 11/1448 714/19 |
| 2015/0277762 A1* | 10/2015 | Guo | G06F 3/061 711/154 |
| 2015/0347252 A1* | 12/2015 | Andre | G06F 11/008 714/6.3 |
| 2015/0363286 A1* | 12/2015 | Blea | G06F 11/2069 714/6.3 |

* cited by examiner

512 NODE INFORMATION TABLE (Manager)

| NODE ID | NODE NAME | OS TYPE | AGENT VERSION | IP ADDRESS |
|---|---|---|---|---|
| 1 | server1 | RHEL6 | V16.1 | 10.124.6.119 |
| 2 | server2 | solaris | V16.1 | 10.124.6.65 |
| 3 | server3 | windows | V16.2 | 10.124.194.195 |

FIG. 8

513 TFO INFORMATION TABLE (Manager)

| TFO-ID | NODE ID | Primary_FCU-ID | Secondary_FCU-ID |
|---|---|---|---|
| 1 | 1 | 1 | 2 |
| 2 | 2 | 2 | 1 |
| 3 | 3 | 1 | 2 |

FIG. 9

514 DEVICE INFORMATION TABLE (Manager)

| DEVICE ID | NODE ID | DEVICE NAME | TFO-ID | Primary_LUN | Secondary_LUN | BLOCK SIZE |
|---|---|---|---|---|---|---|
| 1 | 1 | /dev/sdc | 1 | 0x3 | 0x4 | 39062 |
| 2 | 1 | /dev/sde | 1 | 0x5 | 0x2 | 524288 |
| 3 | 1 | /dev/sdg | 1 | 0xc1 | 0xbe | 524288 |
| 4 | 1 | /dev/sdh | 1 | 0xb3 | 0x36 | 15938 |
| 5 | 2 | /dev/sdd | 2 | 0x6 | 0x5 | 64196 |
| 6 | 2 | /dev/sdf | 2 | 0x4 | 0x3 | 64196 |
| 7 | 2 | /dev/dsk/c1t0d5s6 | 2 | 0x46 | 0xd9 | 64196 |
| 8 | 2 | /dev/dsk/c1t0d5s3 | 2 | 0x5d | 0x8d | 524288 |
| 9 | 2 | /dev/dsk/c1t0d6s6 | 2 | 0xa1 | 0xac | 524230 |
| 10 | 2 | /dev/dsk/c1t0d7s6 | 2 | 0xe9 | 0x6d | 35694904 |
| 11 | 3 | g1d1p1 | 3 | 0xcf | 0x5 | 1024000 |
| 12 | 3 | g1d1p2 | 3 | 0x24 | 0xfb | 34668544 |
| 13 | 3 | g1d1p3 | 3 | 0x86 | 0xea | 524288 |
| 14 | 3 | g1d2p1 | 3 | 0x63 | 0x8d | 34668544 |
| 15 | 3 | g1d2p2 | 3 | 0x51 | 0xc7 | 34668544 |

515 COPY PAIR INFORMATION TABLE (Manager)

| PAIR ID | COPY-SOURCE DEVICE ID | COPY-SOURCE NODE ID | COPY-DESTINATION DEVICE ID | COPY-DESTINATION NODE ID | GROUP NAME | COPY DIRECTION | OPERATION SERVER |
|---|---|---|---|---|---|---|---|
| 1 | 1 | 1 | 2 | 1 | group1 | bi-direction | both |
| 2 | 5 | 2 | 6 | 2 | group2 | bi-direction | both |
| 3 | 13 | 3 | 8 | 2 | group2 | bi-direction | replica |
| 4 | 13 | 3 | 11 | 3 | | bi-direction | original |
| 5 | 14 | 3 | 15 | 3 | | bi-direction | original |

112 DEVICE INFORMATION TABLE (Agent)

| DEVICE ID | DEVICE NAME | TFO-ID | Primary_LUN | Secondary_LUN | BLOCK SIZE |
|---|---|---|---|---|---|
| 1 | /dev/sdc | 1 | 0x3 | 0xe4 | 39062 |
| 2 | /dev/sde | 1 | 0x5 | 0x2 | 524288 |
| 3 | /dev/sdg | 1 | 0xc1 | 0xbe | 524288 |
| 4 | /dev/sdh | 1 | 0xb3 | 0x36 | 15938 |

FIG. 13

113 COPY PAIR INFORMATION TABLE (Agent)

| PAIR ID | COPY-SOURCE DEVICE ID | COPY-SOURCE NODE ID | COPY-DESTINATION DEVICE ID | COPY-DESTINATION NODE ID | GROUP NAME | COPY DIRECTION | OPERATION SERVER |
|---------|----------------------|---------------------|---------------------------|--------------------------|------------|----------------|------------------|
| 1 | 1 | 1 | 2 | 1 | group1 | bi-direction | both |

FIG. 14

INFORMATION PROCESSING APPARATUS AND STORAGE SYSTEM

CROSS-REFERENCE TO RELATED APPLICATION

This application is based upon and claims the benefit of priority of the prior Japanese Patent Application No. 2014-067394, filed on Mar. 28, 2014, the entire contents of which are incorporated herein by reference.

FIELD

The embodiments discussed herein relate to an information processing apparatus and a storage system.

BACKGROUND

Failover is a technique for improving reliability of storage apparatuses. In failover, a plurality of storage apparatuses is clustered. For example, while one of the storage apparatuses is performing an operation, if the storage apparatus goes down because of a malfunction of a device therein, another storage apparatus is allowed to take over the ongoing operation. There is also a technique referred to as transparent failover (TFO).

In TFO, an apparatus (a host) such as a server accessing storage apparatuses is not notified of occurrence of failover. TFO may be set per logical volume, and another storage apparatus is automatically allowed to take over the input and output (I/O) of a data writing and reading operation performed by a malfunctioning storage apparatus. In this operation, the user is allowed to continue the ongoing operation without being conscious of occurrence of failure. In addition, the recovery time is reduced and the storage administrator's work burden is reduced.

Volumes used in TFO (hereinafter, TFO volumes) are seen by a host as a single volume. This is realized by using, for example, target port group support (TPGS) and connecting a plurality of storage apparatuses to the host via respective paths (communication paths). In such case, common small computer system interface (SCSI) unique ID (Inquiry VPD page #83) of the devices are used among the clustered storage apparatuses, and a path used by an operating storage apparatus is set to "Active" and a path used by a standby storage apparatus is set to "Standby." The host is only allowed to access the operating storage apparatus via the "Active" path. When the operating storage apparatus goes down, the standby path is changed to the "Active" path. In this way, the I/O of a data writing and reading operation is automatically taken over by the storage apparatus connected to the host via the path that has been changed to "Active."

As a technique relating to clustering of storage apparatuses, for example, asynchronous remote copy that is performed in conjunction with a storage clustering technique is being considered. In addition, a technique relating to failover recovery between storage systems using virtual volume modules is also being considered.

See, for example, the following documents:
Japanese Laid-open Patent Publication No. 2011-76130
Japanese Laid-open Patent Publication No. 2006-48676

When data in a TFO volume is operated, there are cases where logical unit numbers (LUNs) in a storage apparatus are specified, instead of device names commonly set among the storage apparatuses. A LUN is an identification number used for identifying a storage device in a storage apparatus. For example, when a host operates a TFO volume, the host converts the device names of the operation target into the corresponding LUNs, to specify the operation target.

Normally, when data in a TFO volume is operated, the operation target is specified with device names. If the operation target is specified with device names, while the device names need to match device names of a plurality of storage apparatuses forming a TFO volume, the LUNs of the storage devices in the "Active" storage apparatus do not need to match those of the storage device in the "Standby" storage apparatus. To match these LUNs in the "Active" and "Standby" storage apparatuses, the administrator needs to change configurations of the storage apparatuses. Namely, the administrator's burden is significantly increased. Thus, under the present circumstances, even when storage devices have an active-standby relationship, the LUNs are not matched in most cases.

However, when data is operated by specifying the LUNs of a TFO volume as the operation target, if TFO is executed, since the LUNs of the volumes in the "Active" and "Standby" storage apparatuses do not match, an erroneous storage device is specified after TFO.

SUMMARY

According to an aspect, there is provided an information processing apparatus connected to a first storage apparatus of a first type and a second storage apparatus of a second type, which takes over an operation request directed to the first storage apparatus when transparent failover is executed, via a network, the information processing apparatus including: an interface unit that is connected to the network; and a processor that performs a procedure including: adding type information indicating the first type in a first operation request in which operation target storage devices are specified by unique identifiers, respectively, used in the first storage apparatus and outputting the first operation request to the first storage apparatus through the network via the interface unit and adding, when the information processing apparatus transmits the first operation request to the second storage apparatus and receives an error response indicating a type error from the second storage apparatus after transparent failover is executed, type information indicating the second type in a second operation request in which operation target storage devices are specified by unique identifiers, respectively, used in the second storage apparatus and outputting the second operation request to the second storage apparatus through the network via the interface unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an exemplary node information table included in the copy management unit;

FIG. 9 illustrates an exemplary TFO information table included in the copy management unit;

FIG. 10 illustrates an exemplary device information table included in the copy management unit;

FIG. 11 illustrates an exemplary copy pair information table included in the copy management unit;

FIG. 13 illustrates an exemplary device information table included in the copy agent;

FIG. 14 illustrates an exemplary copy pair information table included in the copy agent;

DESCRIPTION OF EMBODIMENTS

Figure 1:
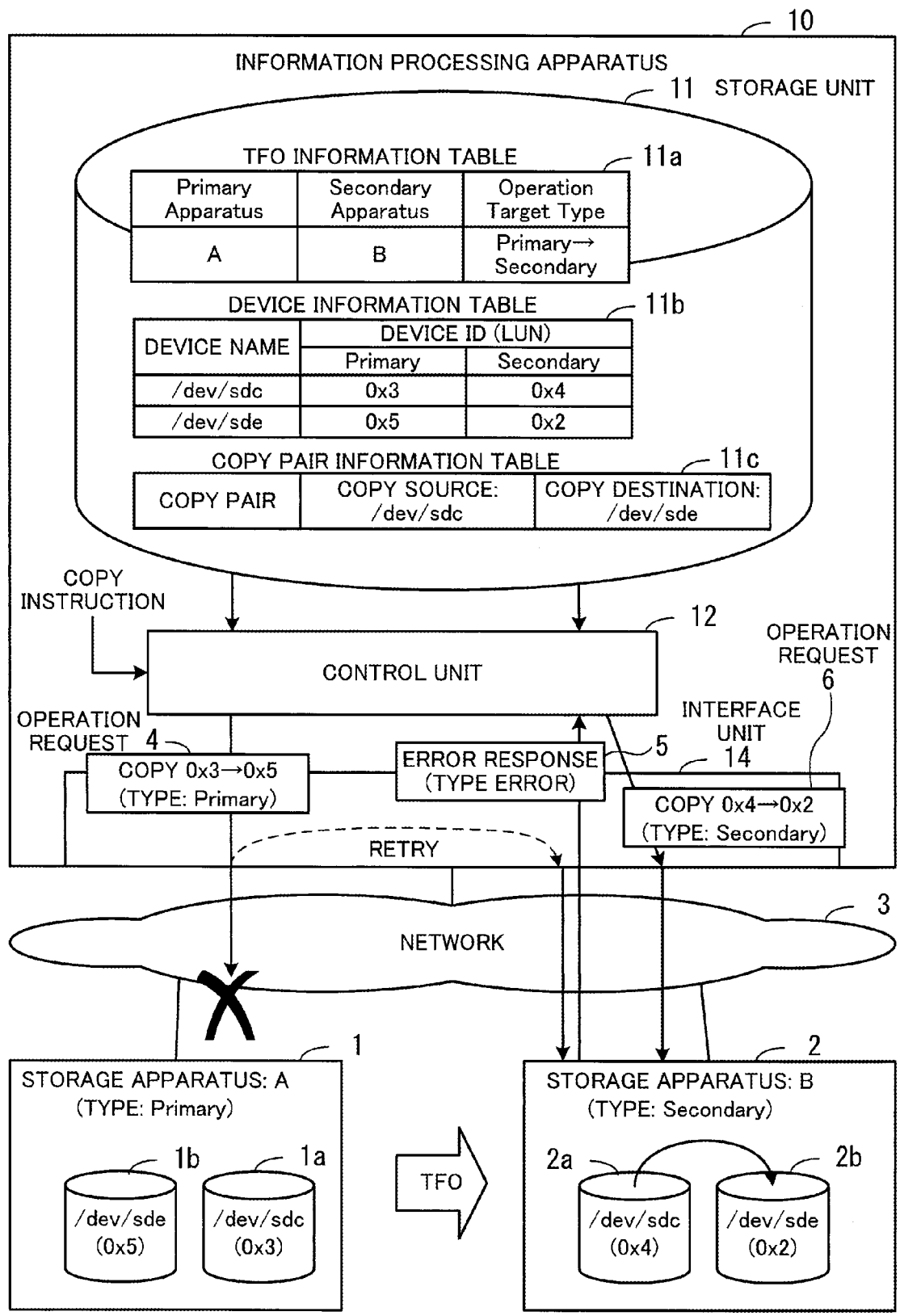
FIG. 1 illustrates an exemplary system configuration according to a first embodiment.

Several embodiments will be described below with reference to the accompanying drawings, wherein like reference characters refer to like elements throughout.

In addition, a plurality of embodiments may be combined to such an extent that does not cause inconsistency.

First Embodiment

First, a first embodiment will be described. According to the first embodiment, when a user operates data in storage devices in a storage apparatus by specifying identification information used in the storage apparatus, even if transparent failover (TFO) is executed, the user is capable of operating the data in accurate storage devices. The data operation is copying data in a storage apparatus.

In a TFO volume, there are cases where device IDs of storage devices included in "Active" and "Standby" storage apparatuses do not match. In such cases, when the user performs a data operation by specifying an operation target with device IDs and TFO is executed, a request in which erroneous device IDs are specified as the operation target is transmitted to a substituting storage apparatus used after the TFO. Such problem occurs in the following cases:
1) failover is executed before an operation is issued;
2) failover is executed between when an operation is issued and when the operation is performed; and
3) failover is executed while an operation is being performed.

Even in such cases, the first embodiment enables the operation by providing accurate device IDs to a storage apparatus that is used as the operation target after TFO.

FIG. 1 illustrates an exemplary system configuration according to the first embodiment. An information processing apparatus 10 is connected to a plurality of storage apparatuses 1 and 2 via a network 3. The storage apparatus 1 includes two storage devices 1a and 1b. The storage device 1a has a device name "/dev/sdc" and a device ID "0x3." The storage apparatus 1b has a device name "/dev/sde" and a device ID "0x5." In addition, "Primary" is set as the apparatus type of the storage apparatus 1. The storage apparatus 2 also includes two storage devices 2a and 2b. The storage device 2a has a device name "/dev/sdc" and a device ID "0x4." The storage device 2b has a device name "/dev/sde" and a device ID "0x2." In addition, "Secondary" is set as the apparatus type of the storage apparatus 2.

In this way, while the storage devices 1a and 2a of the storage apparatuses 1 and 2, respectively, have the same device name, these devices 1a and 2a have different device IDs. Likewise, while the storage devices 1b and 2b of the storage apparatuses 1 and 2 have the same device name, these devices 1b and 2b have different device IDs. In addition, normally, the information processing apparatus 10 operates the two storage apparatuses 1 and 2 by using the device names or the IDs corresponding to the device names. The device IDs of the storage devices 1a, 1b, 2a, and 2b are logical unit numbers (LUNs), for example.

The storage apparatuses 1 and 2 form TFO volumes. Namely, one of the storage apparatuses 1 and 2 is used as an operating (Active) storage apparatus and the other storage apparatus is used as a standby (Standby) storage apparatus. If the operating storage apparatus malfunctions, the standby storage apparatus is operated. An operation request originally transmitted to the malfunctioning storage apparatus is transmitted to the storage apparatus that is newly set as the operating storage apparatus. In the example in FIG. 1, when both of the storage apparatuses 1 and 2 properly operate, the storage apparatus 1 whose type is "Primary" is used as the "Active" storage apparatus and the storage apparatus whose type is "Secondary" is used as the "Standby" storage apparatus. Thus, as long as the storage apparatus 1 properly operates, an operation request 4 (for example, a copy operation request) output from the information processing apparatus 10 is processed by the storage apparatus 1.

In addition, when the storage apparatus 1 or 2 switches to the "Active" storage apparatus and receives an operation request, this storage apparatus 1 or 2 compares the type specified in the operation request with its own type. In addition, when the types match, this storage apparatus 1 or 2 performs processing in accordance with the operation request. However, when the types do not match, the storage apparatus 1 or 2 transmits an error response 5 indicating a type error.

The information processing apparatus 10 operates data in the storage apparatuses 1 and 2. When operating data in the storage apparatuses 1 and 2, the information processing apparatus 10 specifies an operation target storage apparatus by using device names or device IDs. FIG. 1 illustrates functions of the information processing apparatus 10 for performing an operation by specifying an operation target storage apparatus by using device IDs.

The information processing apparatus 10 includes a storage unit 11, a control unit 12, and an interface unit 14. The storage unit 11 stores a TFO information table 11a, a device information table 11b, and a copy pair information table 11c. In the TFO information table 11a, "A" is set as the name of the storage apparatus 1 whose type is "Primary" and "B" is set as the name of the storage apparatus 2 whose type is "Secondary." In addition, the type of the storage apparatus used as the current operation target is also set in the TFO information table 11a. In the device information table 11b, the device IDs of the storage devices in the storage apparatus 1 whose type is "Primary" and the device IDs of the storage devices in the storage apparatus 2 whose type is "Secondary" are set in association with the corresponding device names. In the copy pair information table 11c, a pair of a copy-source device name and a copy-destination device name (a copy pair) used when a copy operation is performed is set.

The control unit 12 generates an operation request in which operation target storage devices are specified by their respective identifiers that are uniquely used in the operation target storage apparatus 1 whose type is "Primary." The control unit 12 adds type information indicating the type of the storage apparatus in the operation request and outputs the operation request to the storage apparatus 1 via the network 3. For example, when receiving a copy instruction, the control unit 12 refers to the copy pair information table 11c in the storage unit 11 and recognizes the device IDs of the copy-source and copy-destination storage devices. In addition, the control unit 12 acquires the device IDs of the copy-source and copy-destination storage devices in the storage apparatus 1 whose type is "Primary" from the device information table 11b in the storage unit 11. In addition, the control unit 12 generates the operation request 4 for instructing a copy operation. In the operation request 4, the copy-source and copy-destination storage devices are specified by the acquired device IDs. The control unit 12 adds the type "Primary" of the operation target storage apparatus 1 in the generated operation request 4 and outputs the operation request 4 to the operation target storage apparatus 1.

When TFO is executed, the control unit 12 transmits the operation request to the storage apparatus 2 whose type is "Secondary." When the storage apparatus 2 outputs the error response 5 indicating a type error, the control unit 12 receives the error response 5. When receiving the error response 5, the control unit 12 generates an operation request in which operation target storage devices are specified by identifiers that are uniquely used in the storage apparatus 2, adds type information indicating the type of the storage apparatus in the operation request, and outputs the operation request to the storage apparatus 2 via the network 3.

For example, when receiving the error response 5, the control unit 12 determines that the operation target has changed to the storage apparatus 2 and changes the operation target type in the TFO information table 11a in the storage unit 11 to "Secondary." Next, the control unit 12 refers to the copy pair information table 11c in the storage unit 11 and recognizes the device IDs of the copy-source and copy-destination storage devices. In addition, the control unit 12 refers to the device information table 11b in the storage unit 11 and acquires the device IDs of the copy-source and copy-destination storage devices in the storage apparatus 2 whose type is "Secondary." Next, the control unit 12 generates an operation request 6 for instructing a copy operation. In the operation request 6, the copy-source and copy-destination storage devices are specified by the acquired device IDs. The control unit 12 adds the type "Secondary" of the operation target storage apparatus 2 in the generated operation request 6 and outputs the operation request 6 to the operation target storage apparatus 2.

The interface unit 14 transmits the operation request 4 or 6 output by the control unit 12 to the storage apparatus 1 or 2 via the network 3. If the transmission of the operation request 4 or 6 fails, the interface unit 14 retransmits the operation request a predetermined number of times (retry). In addition, when receiving the error response 5 from the storage apparatus 1 or 2, the interface unit 14 forwards the error response 5 to the control unit 12.

In such system, when the storage apparatus 1 whose type is "Primary" is used as the "Active" storage apparatus, if a copy instruction is input to the information processing apparatus 10, the control unit 12 outputs the operation request 4 in which device IDs of storage devices are specified. The operation request 4 is for performing a data copy operation from a storage device whose device name is "/dev/sdc" to a storage device whose device name is "/dev/sde." In the operation request 4, the device ID "0x3" of the storage device 1a in the storage apparatus 1 is set as the copy source and the device ID "0x5" of the storage device 1b in the storage apparatus 1 is set as the copy destination. In addition, the type "Primary" of the operation target storage apparatus 1 is added in the operation request 4. Next, the operation request 4 is output by the interface unit 14 to the storage apparatus 1 via the network 3.

If a failure is caused in the storage apparatus and TFO is executed, the operation target is automatically changed to the storage apparatus 2 whose type is "Secondary." Namely, the storage apparatus 2 is changed to the "Active" storage apparatus and the storage apparatus 1 is changed to the "Standby" storage apparatus.

Since the interface unit 14 does not receive a response from the storage apparatus 1, the control unit determines that the transmission of the operation request 4 has failed. Next, the interface unit 14 performs a retry to transmit the operation request 4 to the storage apparatus 2 via the network 3. The operation request 4 is received by the storage apparatus 2 that has been changed to the "Active" storage apparatus at this point. When receiving the operation request 4, the storage apparatus 2 compares the type "Primary" added in the operation request 4 with its own type "Secondary." Since the storage apparatus 2 determines that the types are different, the storage apparatus 2 transmits the error response 5 indicating a type error to the information processing apparatus 10.

The error response 5 is received by the interface unit 14 of the information processing apparatus and is forwarded to the control unit 12. When receiving the error response 5, the control unit 12 recognizes the execution of TFO and outputs an operation request 6. In this operation request 6, the device ID "0x4" of the storage device 2a in the storage apparatus 2 is set as the copy source and the device ID "0x2" of the storage device 2b in the storage apparatus 2 is set as the copy destination. In addition, the operation request 6 includes the type "Secondary" of the operation target storage apparatus 2. The operation request 6 is transmitted by the interface unit 14 to the storage apparatus 2 via the network 3. When receiving the operation request 6, the storage apparatus 2 compares the type "Secondary" added in the operation request 6 with its own type "Secondary." Since the storage apparatus 2 determines that the types match, the storage apparatus 2 performs a data copy operation in accordance with the operation request 6.

In this way, even when TFO is executed while an operation in which device IDs of storage devices are specified is being performed, a storage apparatus, which has been changed to the active storage apparatus after the TFO, accurately performs an accurate data operation. In the example in FIG. 1, data is accurately copied from the storage device 2a whose device name is "/dev/sdc" to the storage device 2b whose device name is "/dev/sde" in the storage apparatus 2.

In the example in FIG. 1, a copy pair is previously registered in the storage unit 11. However, the user may specify a copy pair when giving a copy instruction. For example, the control unit 12 and the interface unit 14 may be realized by a processor included in the information processing apparatus 10. In addition, for example, the storage unit 11 may be realized by a memory included in the information processing apparatus 10. In addition, lines connecting elements illustrate in FIG. 1 indicate only some of the communication paths. Thus, communication paths other than the illustrated communication paths may also be set.

Second Embodiment

Figure 2:
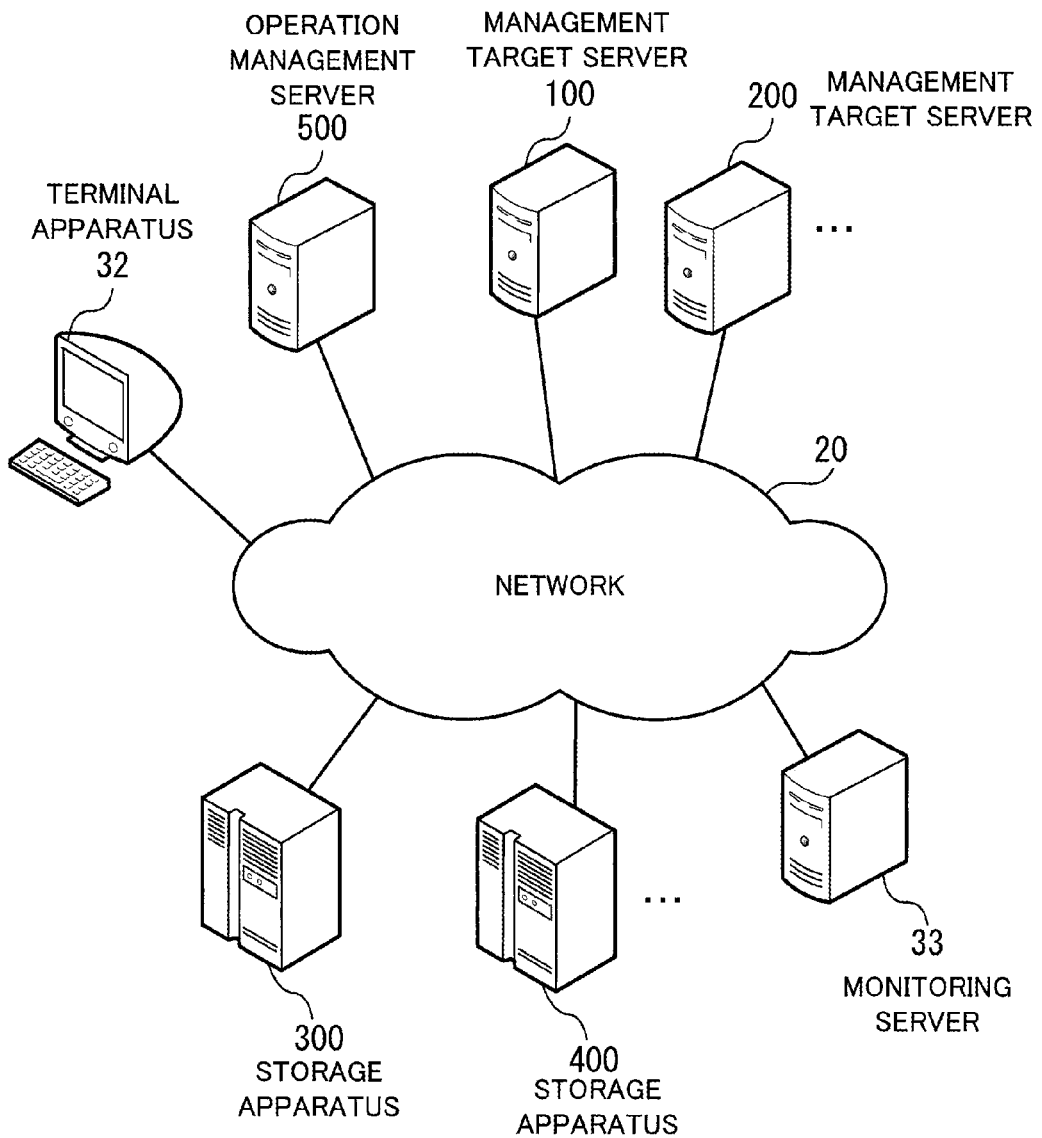
FIG. 2 illustrates an exemplary system configuration according to a second embodiment.

Next, a second embodiment will be described. According to the second embodiment, the entire system is managed via at least one operation management server. FIG. 2 illustrates an exemplary system configuration according to the second embodiment. Management target servers 100 and 200, storage apparatuses 300 and 400, an operation management server 500, a terminal apparatus 32, and a monitoring server 33 are connected to each other via a network 20. As can be seen from FIG. 2, management target servers other than the management target servers 100 and 200 and storage apparatuses other than the storage apparatuses 300 and 400 may also be connected.

The management target servers 100 and 200 access and operate data in the storage apparatuses 300 and 400 via the network 20. The storage apparatuses 300 and 400 include a plurality of storage devices. For example, the storage devices may be hard disk drives (HDDs) or solid state drive (SSDs). A RAID (Redundant Array of Inexpensive Disks) technique may be used for the storage apparatuses 300 and 400.

The operation management server 500 manages operations of the management target servers 100 and 200. The terminal apparatus 32 transmits an instruction from a user to the management target servers 100 and 200. For example, the terminal apparatus 32 transmits an instruction for copying data from one storage device to another storage device in a single storage apparatus to the management target servers 100 and 200. The monitoring server 33 monitors operations of the storage apparatuses 300 and 400. When an "Active" storage apparatus malfunctions, the monitoring server 33 performs a control operation for changing a "Standby" storage apparatus to the "Active" storage apparatus.

Figure 3:
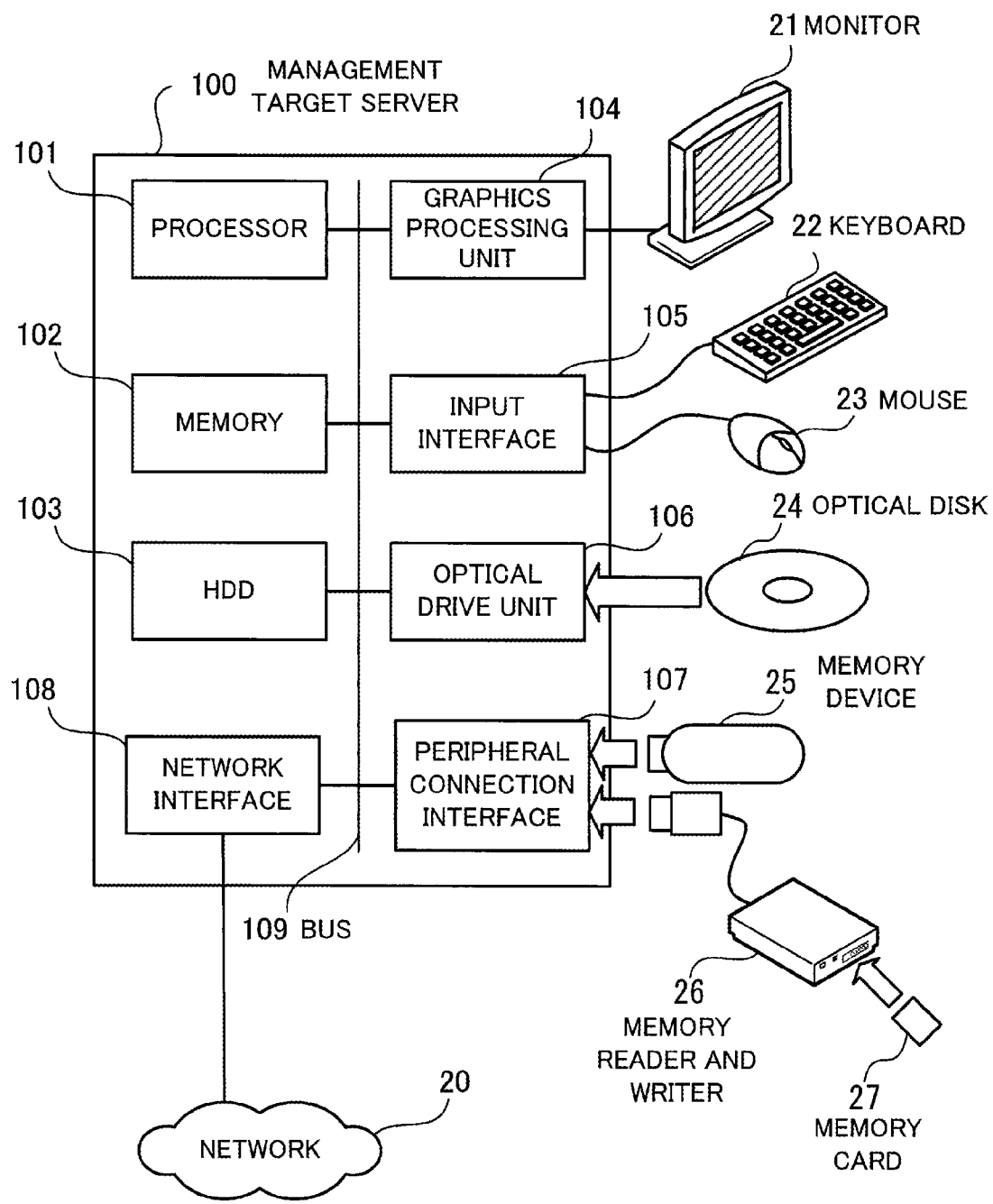
FIG. 3 illustrates an exemplary hardware configuration of a management target server.

FIG. 3 illustrates an exemplary hardware configuration of the management target server 100. The management target server 100 is comprehensively controlled by a processor 101. A memory 102 and a plurality of peripheral devices are connected to the processor 101 via a bus 109. The processor 101 may be a multiprocessor. For example, the processor 101 is a central processing unit (CPU), a micro processing unit (MPU), or a digital signal processor (DSP). At least a part of the functions realized by causing the processor 101 to execute a program may be realized by an electronic circuit such as an application specific integrated circuit (ASIC), a programmable logic device (PLD), or the like.

The memory 102 is used as a main storage device of the management target server 100. At least a part of operating system (OS) programs or application programs executed by the processor 101 is temporarily stored in the memory 102. In addition, various types of data needed for processing by the processor 101 is stored in the memory 102. A volatile semiconductor storage device such as a random access memory (RAM) is used as the memory 102.

Examples of the peripheral devices connected to the bus 109 include an HDD 103, a graphics processing unit 104, an input interface 105, an optical drive unit 106, a peripheral connection interface 107, and a network interface 108. The HDD 103 magnetically writes and reads data in and from a disk therein. The HDD 103 is used as an auxiliary storage device of the management target server 100. OS programs, application programs, and various types of data are stored in the HDD 103. A non-volatile semiconductor storage device such as a flash memory may be used as such auxiliary storage device.

The graphics processing unit 104 is connected to a monitor 21 and displays an image on a screen of the monitor 21 in accordance with a command from the processor 101. For example, a display device using a cathode ray tube (CRT) or a liquid crystal display device may be used as the monitor 21.

The input interface 105 is connected to a keyboard 22 and a mouse 23. The input interface 105 forwards signals transmitted from the keyboard 22 and the mouse 23 to the processor 101. The mouse 23 is an example of a pointing device. Namely, a different pointing device may be used. Examples of such pointing device include a touch panel, a tablet, a touch pad, and a trackball.

The optical drive unit 106 uses laser light to read data recorded on an optical disc 24. The optical disc 24 is a portable recording medium in which data readable by optical reflection is recorded. Examples of the optical disc 24 include a digital versatile disc (DVD), a DVD-RAM, a compact disc read-only memory (CD-ROM), and a compact disc recordable (CD-R)/rewritable (RW).

The peripheral connection interface 107 is a communication interface for connecting a peripheral device to the management target server 100. For example, a memory device 25 and a memory reader and writer 26 may be connected to the peripheral connection interface 107. The memory device 25 is a recording medium capable of communicating with the peripheral connection interface 107. The memory reader and writer 26 is a device for writing and reading data in and from the memory card 27. The memory card 27 is a card-type recording medium.

The network interface 108 is connected to the network 20. The network interface 108 exchanges data with other computers or communication devices via the network 20.

The processing functions according to the second embodiment are realized by using the hardware configuration as described above. While FIG. 3 illustrates an exemplary hardware configuration of the management target server 100, the management target server 200, the operation management server 500, the terminal apparatus 32, and the monitoring server 33 are also realized by using the same hardware configuration. In addition, the information processing apparatus 10 according to the first embodiment is also realized by using the same hardware configuration as that of the management target server 100 illustrated in FIG. 3.

For example, the management target server 100 realizes the processing functions according to the second embodiment by executing a program recorded in a computer-readable recording medium. The program storing the processing contents executed by the management target server 100 may be recorded in various types of recording media. For example, the program executed by the management target server 100 may be stored in the HDD 103. The processor 101 loads at least a part of the program stored in the HDD 103 onto the memory 102 and executes the program. The program executed by the management target server 100 may be recorded in a portable recording medium such as the optical disc 24, the memory device 25, the memory card 27, or the like. The program stored in such a portable recording medium is installed to the HDD 103 in accordance with a control operation by the processor 101 or the like so that the processor 101 is allowed to execute the program. The processor 101 may execute the program by reading the program directly from the portable recording medium.

Figure 4:
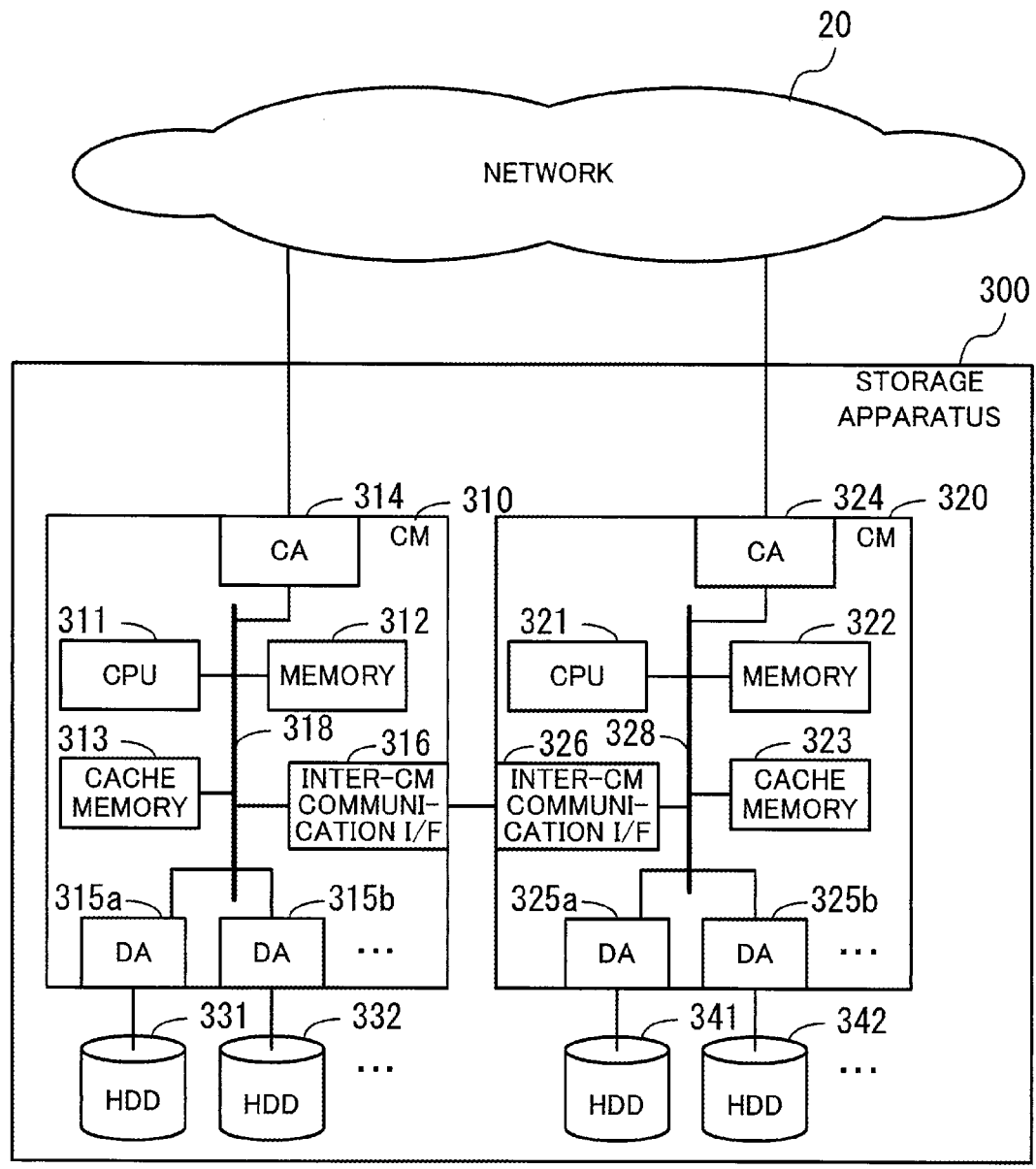
FIG. 4 illustrates an exemplary hardware configuration of a storage apparatus according to the second embodiment.

FIG. 4 illustrates an exemplary hardware configuration of the storage apparatus 300 according to the second embodiment. The storage apparatus 300 includes controller modules (CMs) 310 and 320. The CMs 310 and 320 manage resources such as physical disks in the storage apparatus 300. For example, the CM 310 is connected to a plurality of HDDs 331, 332, etc. The CM 310 manages the resources (storage functions) provided by the connected HDDs 331, 332, etc. The CM 320 is connected to a plurality of HDDs 341, 342, etc. The CM 320 manages the resources (storage functions) provided by the connected HDDs 341, 342, etc. Each of the CMs 310 and 320 is capable of generating a RAID group by combining a plurality of HDDs that are under the management of the CM. SSDs may be used in place of the plurality of HDDs 331, 332, 341, 342, etc.

The CM 310 includes a CPU 311, a memory 312, a cache memory 313, a channel adapter (CA) 314, a plurality of device adapters (DAs) 315a, 315b, etc., and an inter-CM communication I/F 316. These components in the CM 310 are connected to each other via an internal bus 318 in the CM 310. The CPU 311 comprehensively controls the CM 310. For example, the CPU 311 operates data in accordance with a data operation request, on the basis of a program or data stored in the memory 312.

The memory 312 stores various types of information used in control operations performed by the CM 310. The memory 312 also stores programs such as firmware in which processing performed by the CPU 311 is written. The cache memory 313 is a memory for temporarily storing data exchanged with the plurality of HDDs including the HDDs 331 and 332.

The CA 314 is an interface that performs communication via a fibre channel. The DAs 315a, 315b, etc. are connected to the respective HDDs 331, 332, etc. These DAs exchange data with the respective HDDs. The inter-CM communication I/F 316 is an interface that communicates with another CM 320 in the storage apparatus 300. The inter-CM communication I/F 316 performs communication by using peripheral component interconnect (PCI) express, for example. Communication between the CMs 310 and 320 may be performed via a relay circuit referred to as a front-end router (FER).

The CM 320 includes a CPU 321, a memory 322, a cache memory 323, a CA 324, a plurality of DAs 325a, 325b, etc. and an inter-CM communication I/F 326. These components in the CM 320 are connected to each other via an internal bus 328 in the CM 320. Between the CMs 310 and 320, the same components have the same functions.

The storage apparatus 400 is also realized by the same hardware configuration as that of the storage apparatus 300. In addition, the storage apparatuses 1 and 2 according to the first embodiment are also realized by the same hardware configuration as that of the storage apparatus 300.

In the system as described above, the management target servers 100 and 200 operate data in the storage apparatus 300 by specifying LUNs that indicate storage devices in the storage apparatus 300. For example, one of the management target servers causes a storage apparatus to copy data between storage devices therein, by outputting a copy instruction to the storage apparatus.

Figure 5:
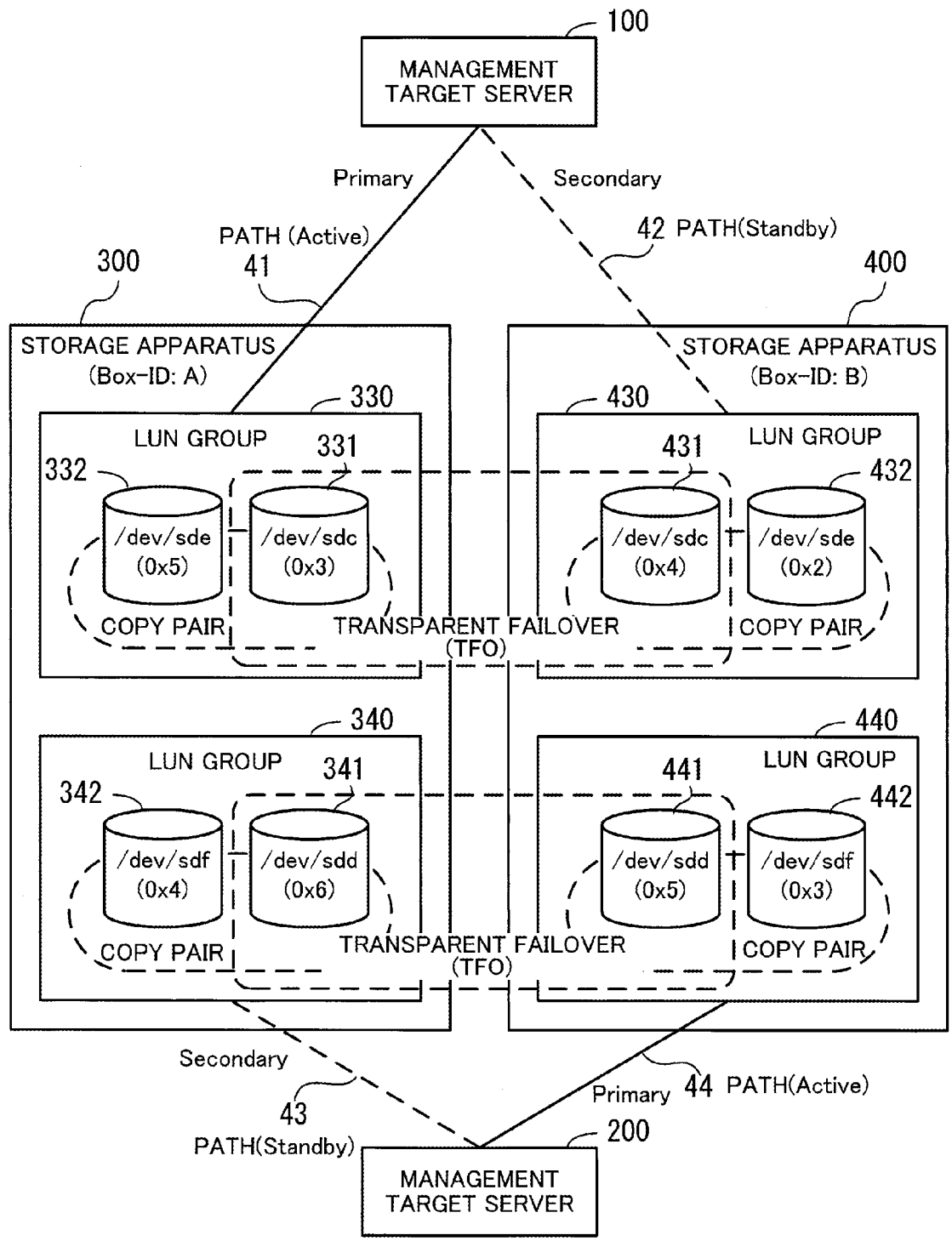
FIG. 5 illustrates exemplary configurations of storage devices in storage apparatuses.

Next, exemplary configurations of storage devices in the storage apparatuses 300 and 400 will be described. FIG. 5 illustrates exemplary configurations of storage devices in the storage apparatuses 300 and 400. Each of the storage apparatuses 300 and 400 is provided with a box identifier (Box-ID). The Box-IDs of the storage apparatuses 300 and 400 are "A" and "B," respectively.

The storage apparatus 300 includes four storage devices 331, 332, 341, and 342. The storage device 331 has a device name "/dev/sdc" and a LUN "0x3." The storage device 332 has a device name "/dev/sde" and a LUN "0x5." The storage device 341 has a device name "/dev/sdd" and a LUN "0x6." The storage device 342 has a device name "/dev/sdf" and a LUN "0x4."

These storage devices 331, 332, 341, and 342 are divided into LUN groups, each of which is a group of volumes recognizable by a host. The storage devices 331 and 332 form a LUN group 330. The storage devices 341 and 342 form a LUN group 340. The storage devices in the respective LUN groups 330 and 340 form a copy pair.

The storage apparatus 400 includes four storage devices 431, 432, 441, and 442. The storage device 431 has a device name "/dev/sdc" and a LUN "0x4." The storage device 432 has a device name "/dev/sde" and a LUN "0x2." The storage device 441 has a device name "/dev/sdd" and a LUN "0x5." The storage device 442 has a device name "/dev/sdf" and a LUN "0x3."

These storage devices 431, 432, 441, and 442 are divided into LUN groups. The storage devices 431 and 432 form a LUN group 430. The storage devices 441 and 442 form a LUN group 440. The storage devices in the respective LUN groups 430 and 440 form a copy pair.

The management target server 100 provides the LUN group 330 in the storage apparatus 300 and the LUN group 430 in the storage apparatus 400 with paths 41 and 42, respectively. The storage device 331 in the storage apparatus 300 and the storage device 431 in the storage apparatus 400 have the same device name and form a TFO volume. Assuming that the management target server 100 recognizes that the operation target types of the storage apparatuses 300 and 400 are "Primary" and "Secondary," respectively, while these two storage apparatuses 300 and 400 are properly operating, the paths 41 and 42 serve as the "Active" and "Standby" paths, respectively.

The management target server 200 provides the LUN group 340 in the storage apparatus 300 and the LUN group 440 in the storage apparatus 400 with paths 43 and 44, respectively. The storage device 341 in the storage apparatus 300 and the storage device 441 in the storage apparatus 400 have the same device name and form a TFO volume. Assuming that the management target server 200 recognizes that the operation target types of the storage apparatuses 400 and 300 are "Primary" and "Secondary," respectively, while these two storage apparatuses 300 and 400 are properly operating, the paths 44 and 43 serve as the "Active" and "Standby" paths, respectively. These management target servers 100 and 200 cause the storage apparatuses 300 and 400 to copy data between storage devices forming a copy pair.

Figure 6:
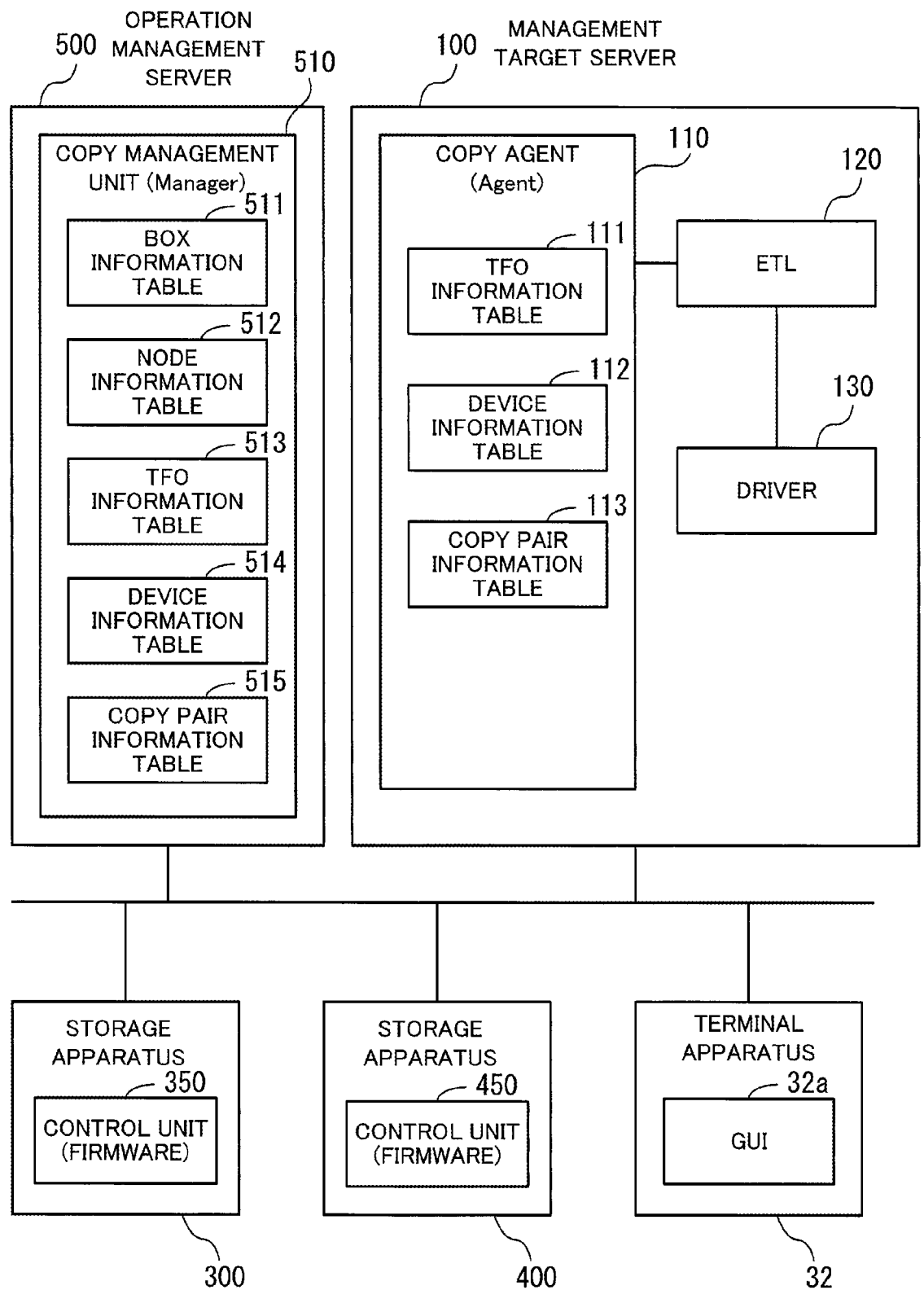
FIG. 6 illustrates exemplary functions for performing a copy operation.

FIG. 6 illustrates exemplary functions for performing a copy operation. The operation management server 500 includes a copy management unit 510 which manages a copy operation between storage devices performed in the system, the storage devices being specified by LUNs. The copy management unit 510 manages a copy operation by using a box information table 511, a node information table 512, a TFO information table 513, a device information table 514, and a copy pair information table 515. These tables are stored in the memory or the HDD in the operation management server 500, for example.

The box information table 511 is a data table for managing information about each box such as each of the storage apparatuses 300 and 400. The node information table 512 is a data table for managing information about the management target servers 100 and 200. The TFO information table 513 is a data table for managing TFO statuses. The device information table 514 is a data table for managing information about each of the storage devices in the storage apparatuses 300 and 400. The copy pair information table 515 is an information table for managing copy pairs.

The management target server 100 includes a copy agent 110, an extraction, transformation and load (ETL) 120, and a driver 130. The copy agent 110 performs an operation of copying data between storage devices specified by LUNs. The copy agent 110 manages an operation by using a TFO information table 111, a device information table 112, and a copy pair information table 113. These tables are data tables for storing the same data as that of the corresponding tables in the copy management unit 510 in the operation management server 500. For example, the ETL 120 generates SCSI commands relating to operations such as data extraction, data conversion, and data insertion performed on the storage apparatuses 300 and 400. The driver 130 controls communication with the storage apparatuses 300 and 400 via the network 20.

The storage apparatuses 300 and 400 include control units 350 and 450, respectively. The control units 350 and 450 control operations of the storage apparatuses 300 and 400, respectively. For example, the control units 350 and 450 are realized by causing a CPU to execute firmware installed in the storage apparatuses 300 and 400, respectively.

The terminal apparatus 32 includes a graphical user interface (GUI) 32a. The GUI 32a transmits input information to the operation management server 500 and displays information transmitted from the operation management server 500 on a monitor.

Figure 7:
FIG. 7 illustrates an exemplary box information table included in a copy management unit.

Hereinafter, each of the tables will be described in detail. FIG. 7 illustrates an example of the box information table 511 included in the copy management unit 510. The box information table 511 includes columns for "FCU-ID" and "Box identifier." In an entry under the column "FCU-ID," a box information identification number (FCU-ID) is set. In an entry under the column "Box identifier," a box identifier (Box-ID) of one of the storage apparatuses 300 and 400 is set.

FIG. 8 illustrates an example of the node information table 512 included in the copy management unit 510. The node information table 512 includes columns for "Node ID," "Node name," "OS type," "Agent version number," and "Internet protocol (IP) address." In an entry under the column "Node ID," the identification number (the node ID) of one of the management target servers 100 and 200 is set. In an entry under the column "Node name," the node name of one of the management target servers 100 and 200 is set. In an entry under the column "OS type," the type of the OS operating on one of the management target servers 100 and 200 is set. In an entry under the column "Agent version number," the version number of the copy agent operating on one of the management target servers 100 and 200 is set. In an entry under the column "IP address," the IP address of one of the management target servers 100 and 200 is set.

FIG. 9 illustrates an example of the TFO information table 513 included in the copy management unit 510. The TFO information table 513 includes columns for "TFO-ID," "Node ID," "Primary FCU-ID," and "Secondary FCU-ID." In an entry under the column "TFO-ID," identification information (TFO-ID) of a combination of TFO target storage apparatuses is set. In an entry under the column "Node ID," the node ID of one of the management target servers 100 and 200 that operates data in the TFO target storage apparatuses is set. In an entry under the column "Primary FCU-ID," the FCU-ID of a storage apparatus whose operation target type is "Primary" is set. In an entry under the column "Secondary FCU-ID," the FCU-ID of a storage apparatus whose operation target type is "Secondary" is set.

FIG. 10 illustrates an example of the device information table 112 included in the copy management unit 510. The device information table 514 includes columns for "Device ID," "Node ID," "Device name," "TFO-ID," "Primary_LUN," "Secondary_LUN," and "Block size." In an entry under the column "device ID," the identification information (a device ID) set as a TFO volume is set. In an entry under the column "Node ID," the node ID of a management target server that operates data in the TFO volume is set. In an entry under the column "device name," the name (device name) of the TFO volume is set. In an entry under the column "TFO-ID," identification information (TFO-ID) set for each TFO management unit is set. In an entry under the column "Primary_LUN," the LUN of a storage device that is in a link set as a TFO volume and that is included in a primary storage apparatus is set. In an entry under the column "Secondary_LUN," the LUN of a storage device that is in a link set as a TFO volume and that is included in a secondary storage apparatus is set. In an entry under the column "Block size," the storage capacity of the TFO volume is indicated by a block number.

FIG. 11 illustrates an example of the copy pair information table 515 included in the copy management unit 510. The copy pair information table 515 includes columns for "Pair ID," "Copy-source device ID," "Copy-source node ID," "Copy-destination device ID," "Copy-destination node ID," "Group name," "Copy direction," and "Operation server." In an entry under the column "Pair ID," identification information of a copy pair (pair ID) is set. In an entry under the column "Copy-source device ID," the device ID of a copy-source TFO volume is set. In an entry under the column "Copy-source node ID," the node ID of a management target server that operates the copy-source TFO volume is set. In an entry under the column "Copy-destination device ID," the device ID of a copy-destination TFO volume is set. In an entry under the column "Copy-destination node ID," the node ID of a management target server that operates the copy-destination TFO volume is set. In an entry under the column "Group name," the group name of a copy pair is set. In an entry under the column "copy direction," a copy direction, that is, whether data is copied in a uni-direction or a bi-direction, is set. In an entry under the column "Operation server," information specifying a management target server(s) that performs a copy operation is set. If "both" is specified in an entry under the column "Operation server," the copy-source and copy-destination management target servers operate the copy-source and copy-destination storage devices, respectively. If "replica" is specified in an entry under the column "Operation server," the copy-destination management target server operates both the copy-source and copy-destination storage devices. If "original" is specified in an entry under the column "Operation server," the copy-source management target server operates both the copy-source and copy-destination storage devices.

Figure 12:
FIG. 12 illustrates an exemplary TFO information table included in a copy agent.

FIG. 12 illustrates an example of the TFO information table 111 included in the copy agent 110. The TFO information table 111 includes columns for "TFO-ID," "Primary_Box-ID," "Secondary_Box-ID," and "Operation target type." In an entry under the column "TFO-ID," a TFO-ID is set. In an entry under the column "Primary_Box-ID," the Box-ID of the primary storage apparatus is set. In an entry under the column "Secondary_Box-ID," the Box-ID of the secondary storage apparatus is set.

FIG. 13 illustrates an example of the device information table 112 included in the copy agent 110. The device information table 112 includes columns for "Device ID," "Device name," "TFO-ID," "Primary_LUN," "Secondary_LUN," and "Block size." The device information table 112 included in the copy agent 110 has the same column names and information as those of the device information table 514 included in the copy management unit 510.

FIG. 14 illustrates an example of the copy pair information table 113 included in the copy agent 110. The copy pair information table 113 includes columns for "Pair ID," "Copy-source device ID," "Copy-source node ID," "Copy-destination device ID," "Copy-destination node ID," "Group name," "Copy direction," and "Operation server." The copy pair information table 113 included in the copy agent 110 has the same column names and information as those of the copy pair information table 515 included in the copy management unit 510. In such system that has a configuration as described above, a copy operation with specified LUNs is performed.

Figure 15:
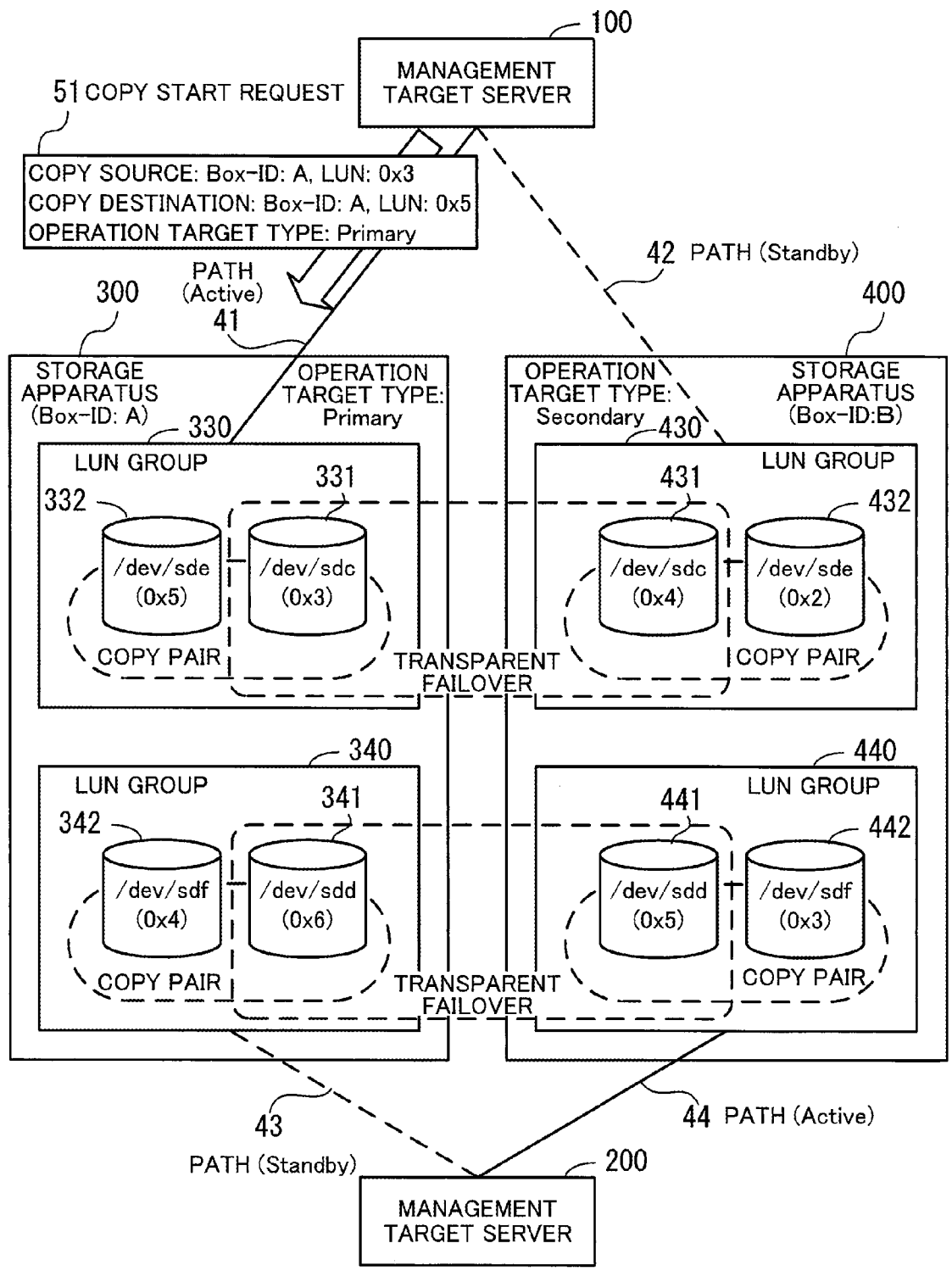
FIGS. 15 to 22 are first to eighth diagrams illustrating an exemplary data operation procedure, respectively.

Next, a case in which the management target server 100 performs an operation of copying data from a TFO volume whose device name is "/dev/sdc" will be described. More specifically, an operation performed when TFO is executed during a copy operation will be described with reference to FIGS. 15 to 22. FIG. 15 is a first diagram illustrating an exemplary data operation procedure.

When performing a copy operation, the management target server 100 converts a device name into a LUN and instructs a copy operation. More specifically, the copy agent 110 of the management target server 100 performs a copy operation as follows:

<step 1>The copy agent 110 refers to the TFO information table 111 and acquires an operation target type. Accordingly, the operation target type "Primary" is acquired.

<step 2>On the basis of the acquired operation target type, the copy agent 110 refers to the device information table 112 and the copy pair information table 113 and converts the device names to the respective LUNs. In the example in FIG. 15, the LUNs of the copy-source and copy-destination storage devices are "0x3" and "0x5," respectively.

<step 3>The copy agent 110 refers to the TFO information table 111 and the device information table 112 and identifies the Box-ID of the operation target storage apparatus. In the example in FIG. 15, both of the Box-IDs of the copy-source and copy-destination storage apparatuses are "A." If data is copied between different storage apparatuses, the Box-IDs are different between the copy-source and copy-destination storage apparatuses.

<step 4>The copy agent 110 transmits a copy start request 51 in which the Box-ID of the copy-source storage apparatus, the LUN of the copy-source storage device, the Box-ID of the copy-destination storage apparatus, the LUN of the copy-destination storage device, and the operation target type are specified. If both the two storage apparatuses 300 and 400 are properly operating, the copy start request 51 is transmitted to the storage apparatus 300 via the "Active" path 41, and data is copied in the storage apparatus 300. However, there are cases where the storage apparatus 300 malfunctions after the copy start request 51 is transmitted.

Figure 16:
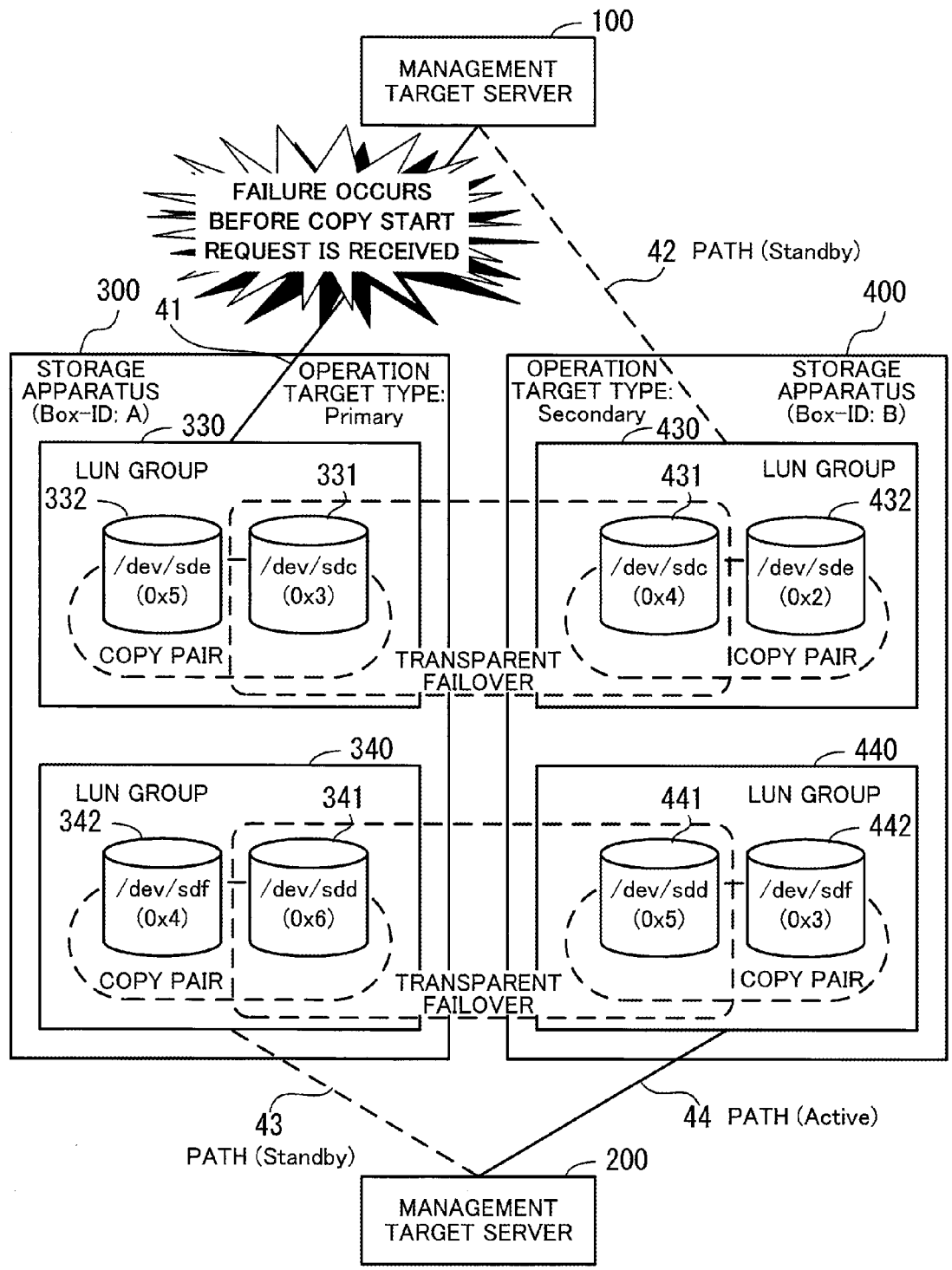

FIG. 16 is a second diagram illustrating the exemplary data operation procedure. As illustrated in FIG. 16, when the storage apparatus 300 malfunctions, the copy start request 51 is not received by the storage apparatus 300.

Figure 17:
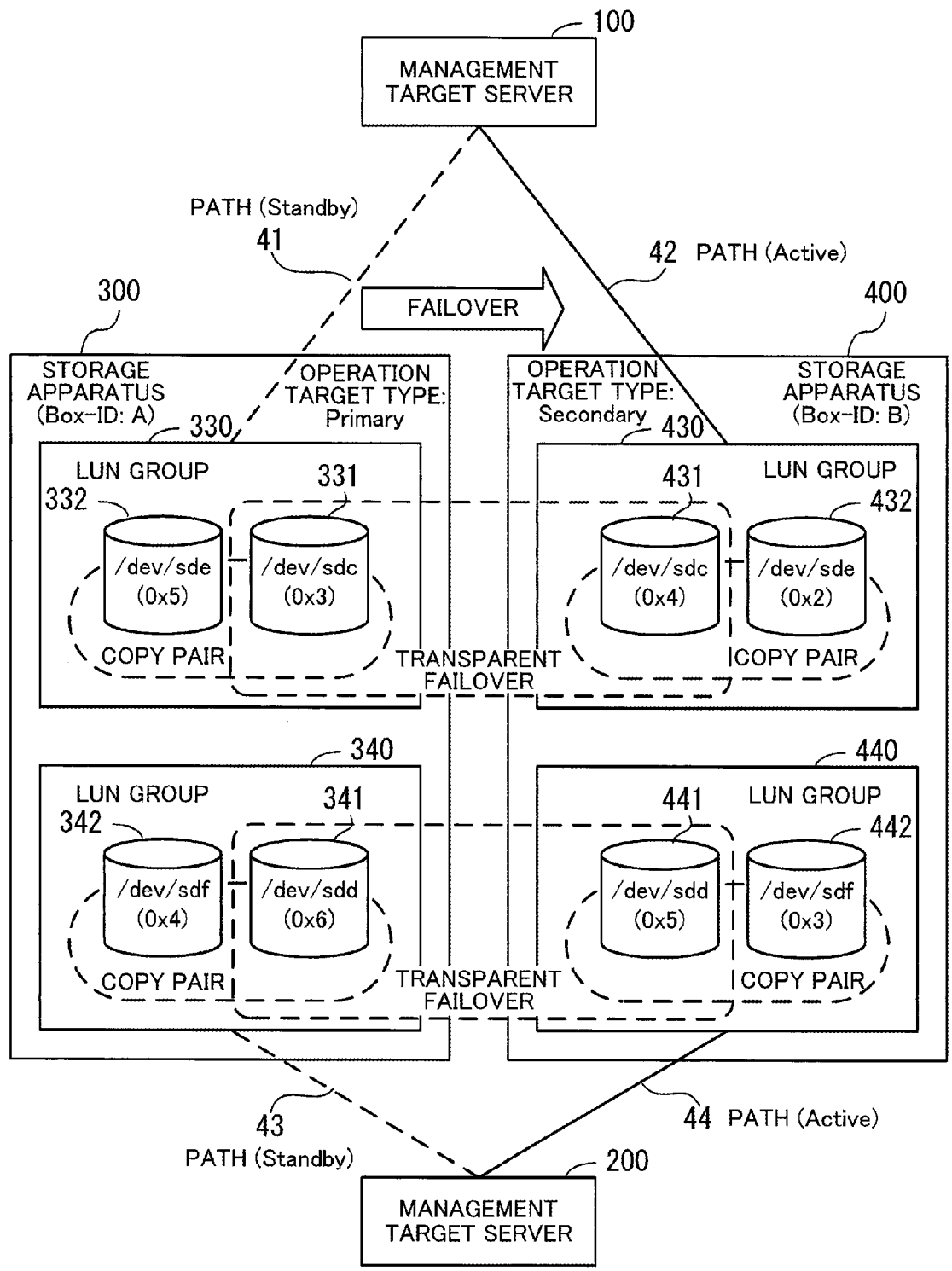

FIG. 17 is a third diagram illustrating the exemplary data operation procedure. When the storage apparatus 300 malfunctions, failover is executed as illustrated in FIG. 17. Namely, the path 42 is changed to "Active" and the path 41 to "Standby." The failover is executed transparently. In the transparent failover processing, the management target server 100 is not notified of the execution of the failover.

Figure 18:
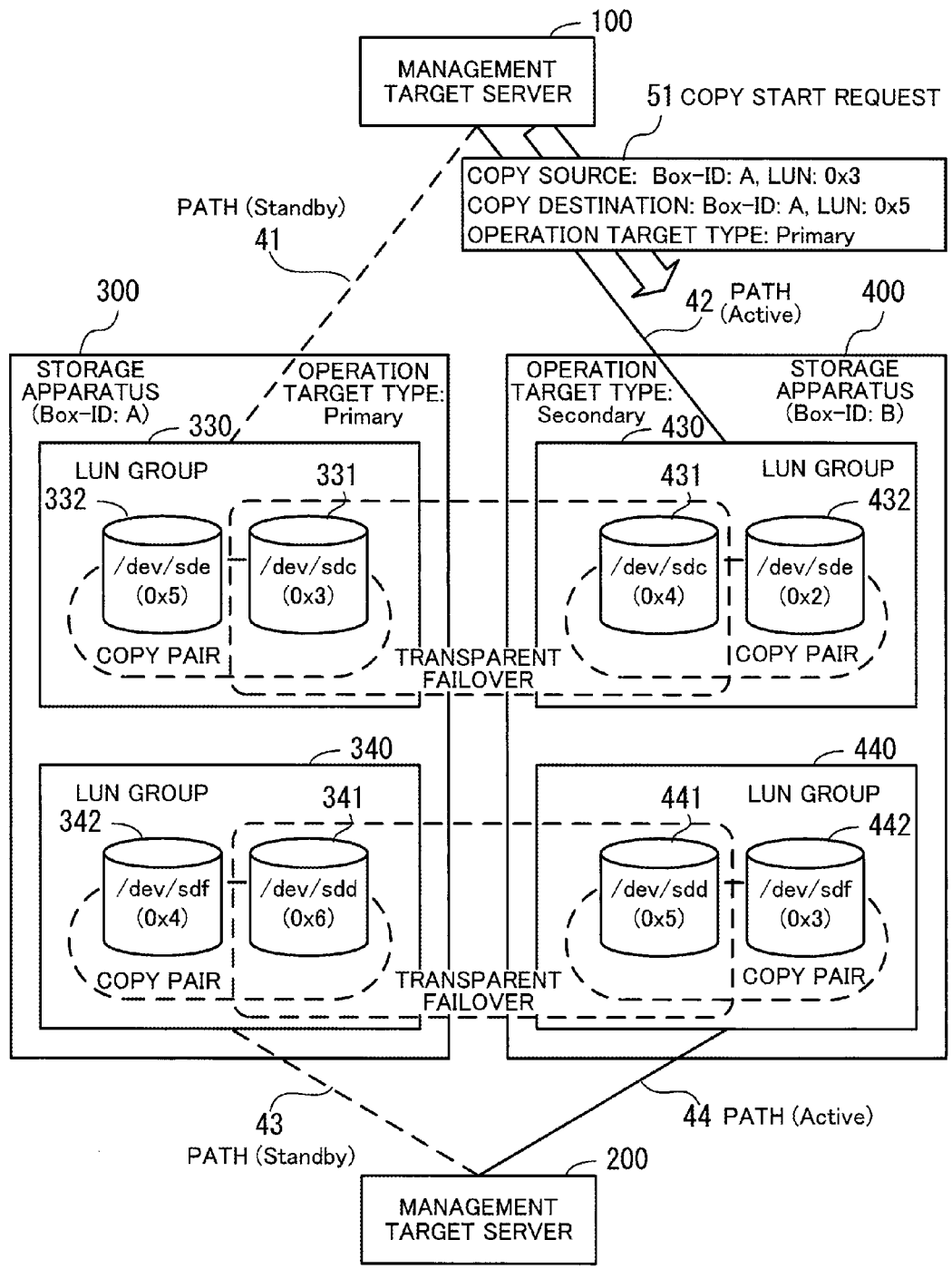

FIG. 18 is a fourth diagram illustrating the exemplary data operation procedure. The management target server 100 detects that failure of the transmission of the copy start request 51 and retransmits the copy start request 51. Since the failover has already been executed, the copy start request 51 is transmitted to the storage apparatus 400 via the path 42. The storage apparatus 400 refers to the operation target type "Primary" included in the copy start request 51 and determines whether this operation target type matches its own operation target type "Secondary." As a result of the determination, since the storage apparatus 400 determines that the operation target types do not match, the storage apparatus 400 determines that the copy start request 51 is an operation instruction directed to the storage apparatus 300, which is another box.

Figure 19:
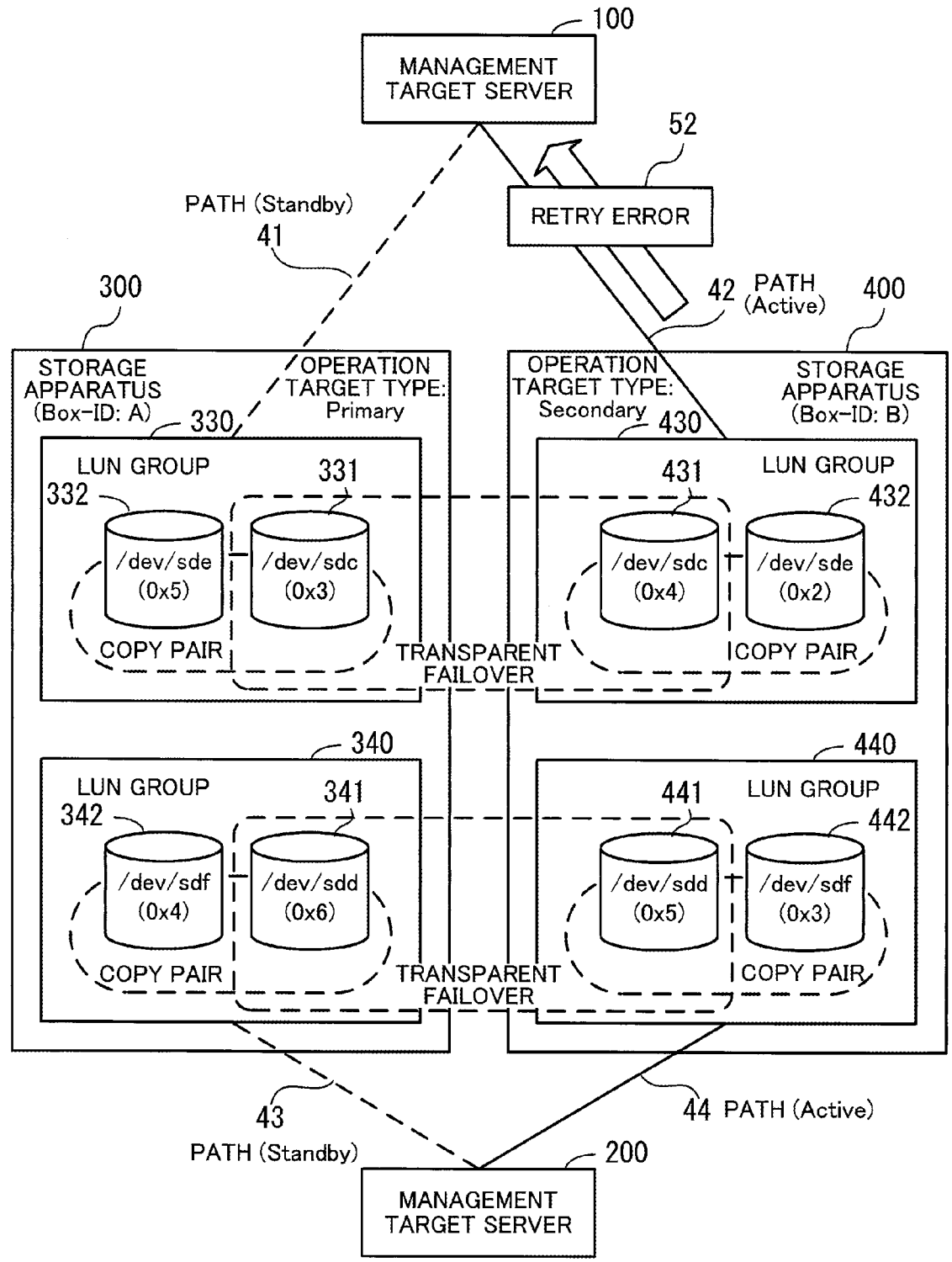

FIG. 19 is a fifth diagram illustrating the exemplary data operation procedure. When detecting that the copy start request 51 has been transmitted to an erroneous destination, the storage apparatus 400 transmits a retry error 52 indicating the execution of the failover to the management target server 100.

Figure 20:
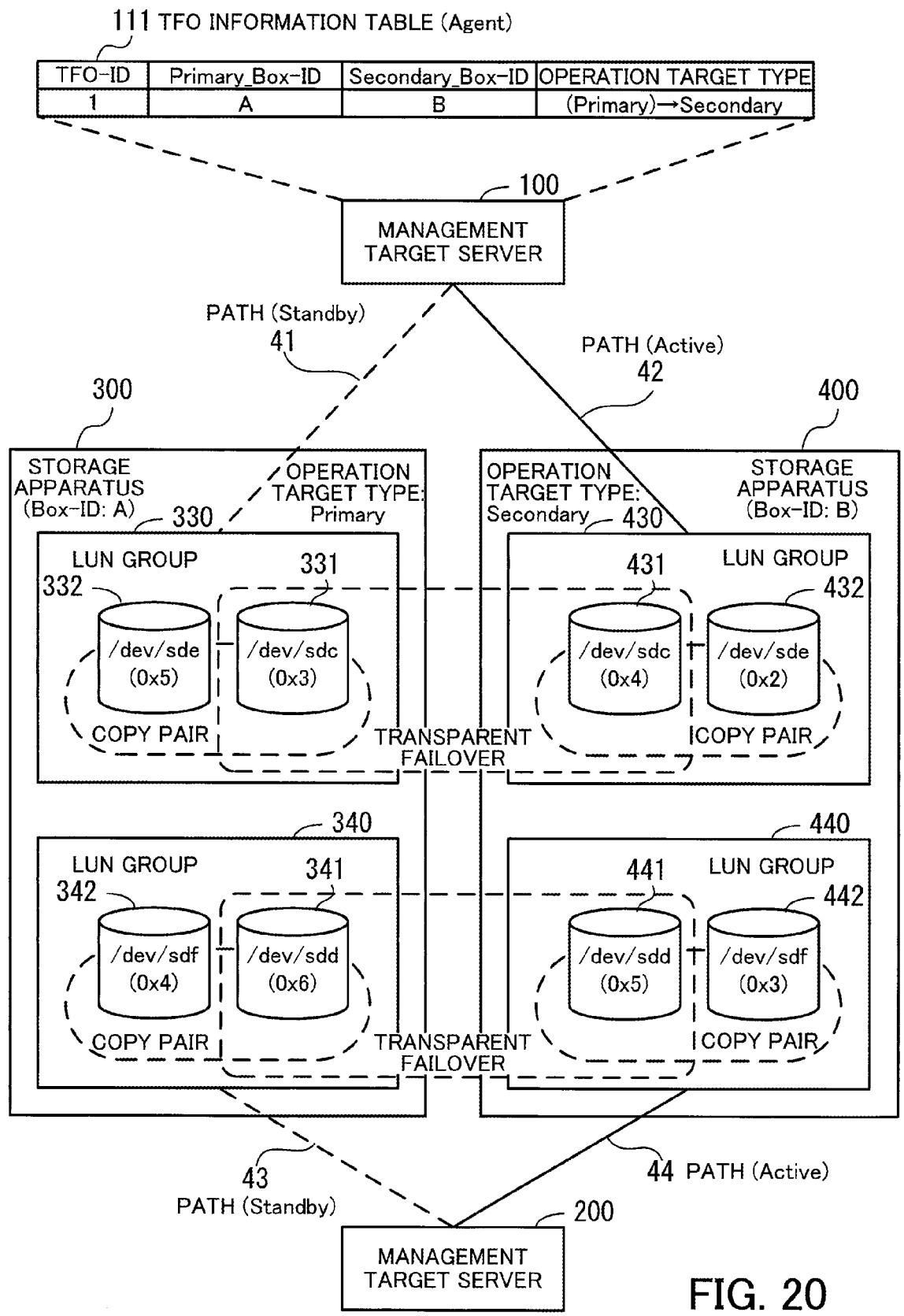

FIG. 20 is a sixth diagram illustrating the exemplary data operation procedure. When receiving the retry error 52, the management target server 100 recognizes the execution of the failover and changes the operation target type in the TFO information table 111 to "Secondary."

Figure 21:
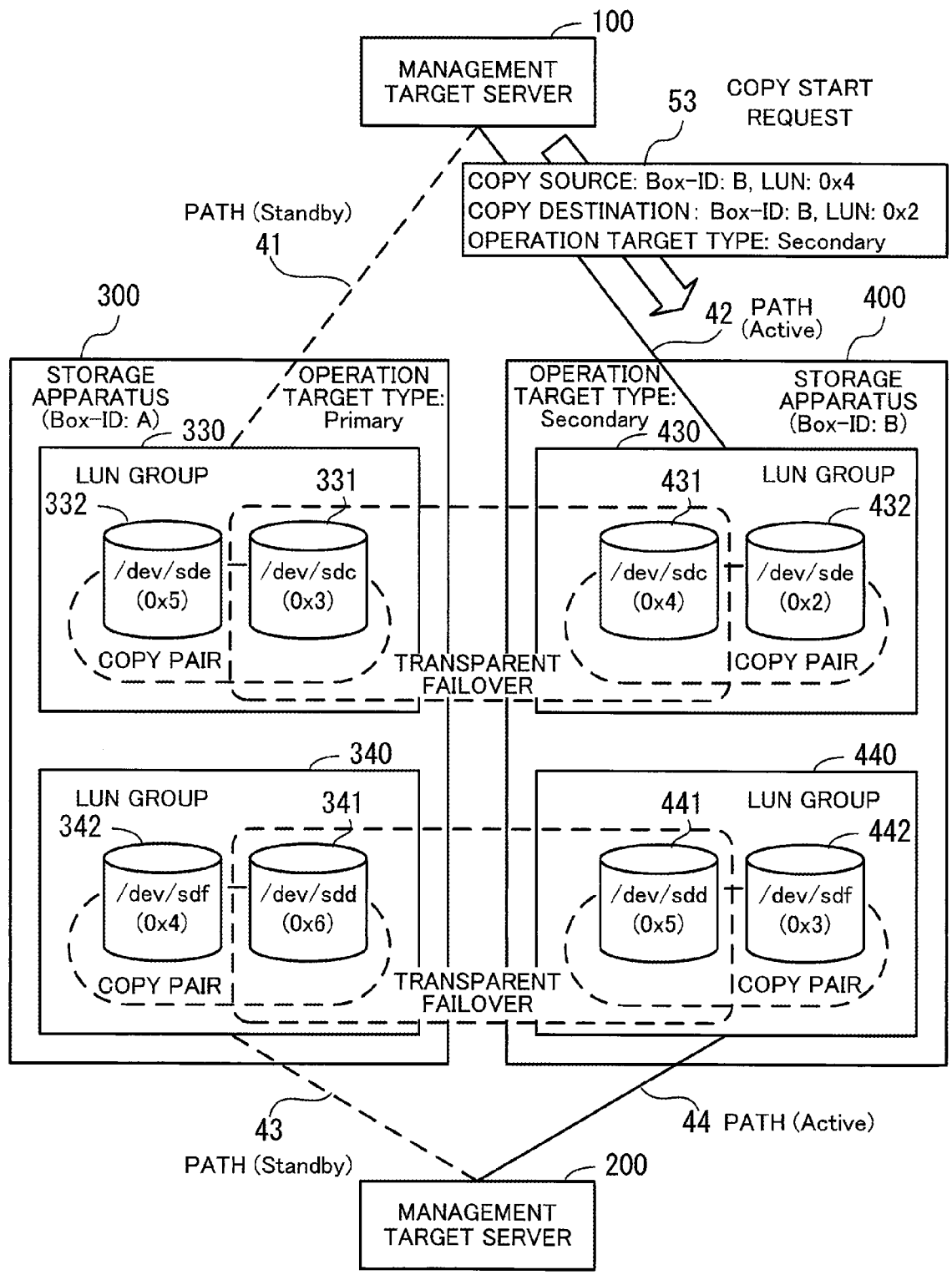

FIG. 21 is a seventh diagram illustrating the exemplary data operation procedure. The management target server 100 refers to the TFO information table 111, the device information table 112, and the copy pair information table 113 and acquires the Box-ID of the secondary storage apparatus and the LUNs of the storage devices.

In the example in FIG. 21, the Box-ID of the copy-source storage apparatus and the Box-ID of the copy-destination storage apparatus are "B." In addition, the LUNs of the copy-source and copy-destination storage devices are "0x4" and "0x2," respectively. Next, on the basis of the acquired information, the management target server 100 transmits a copy start request 53 in which the Box-ID of the copy-source storage apparatus, the LUN of the copy-source storage device, the Box-ID of the copy-destination storage apparatus, the LUN of the copy-destination storage device, and the operation target type "Secondary" are specified. The copy start request 53 is transmitted to the storage apparatus 400 via the path 42.

Figure 22:
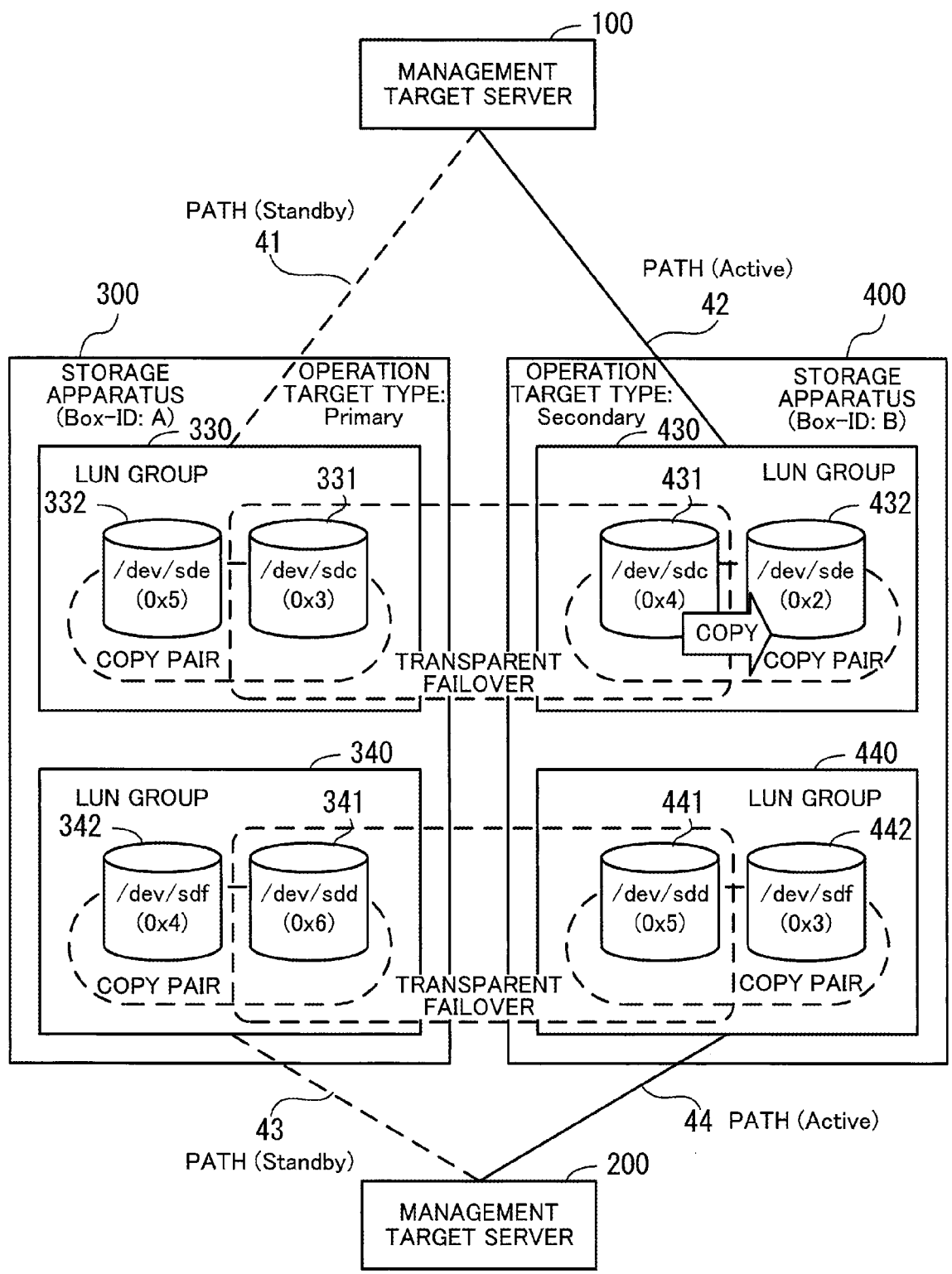

FIG. 22 is an eight diagram illustrating the exemplary data operation procedure. The storage apparatus 400 compares the operation target type "Secondary" specified in the copy start request 53 with its own operation target type "Secondary" and determines that the operation target types match. Next, the storage apparatus 400 starts copying data in accordance with the LUNs of the copy-source and copy-destination storage devices specified in the copy start request 53. In this way, even when TFO is executed while a copy operation in which LUNs are specified is being performed, the storage apparatus 400 substituted for the storage apparatus 300 after the TFO copies data accurately.

Figure 23:
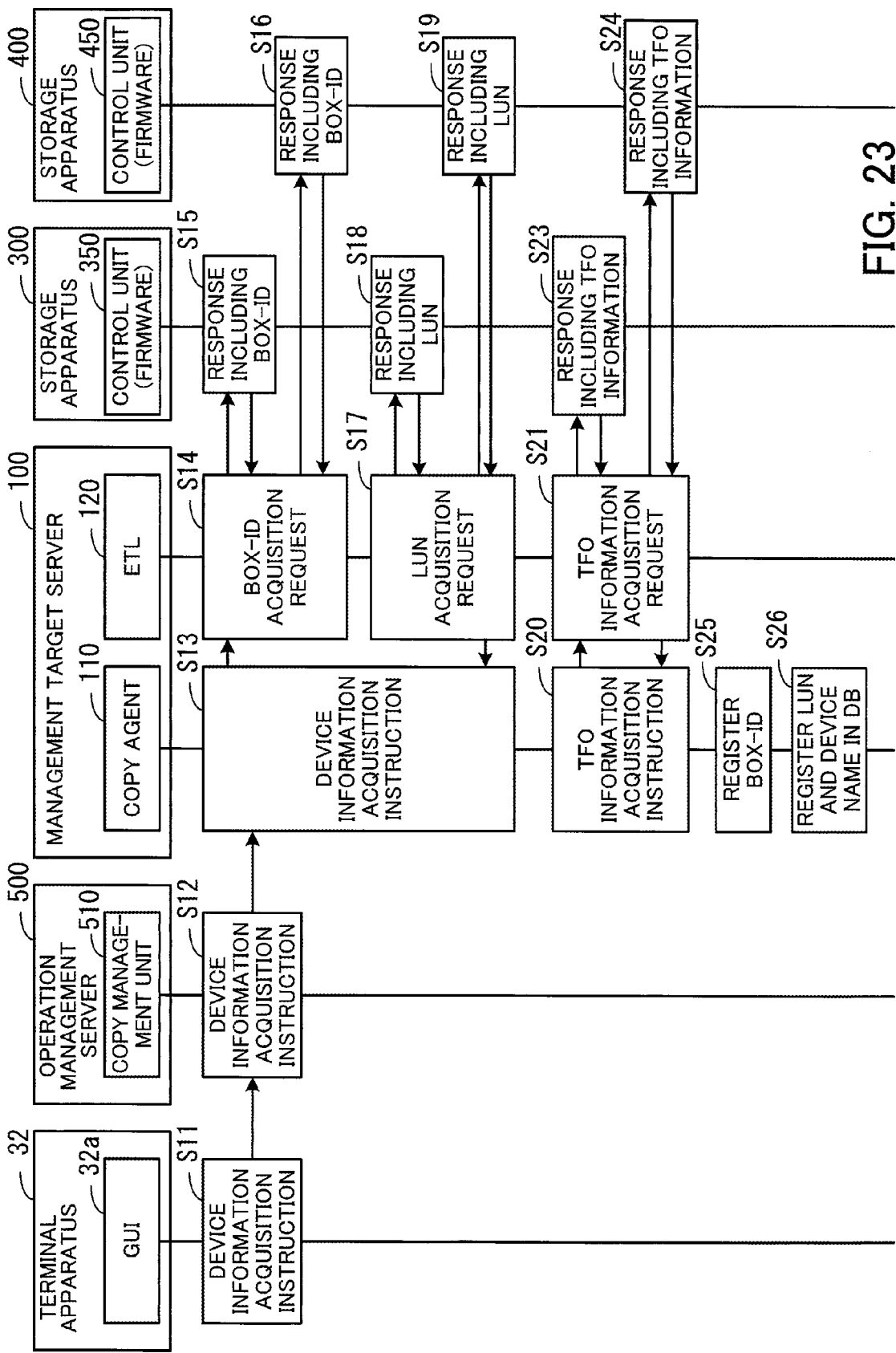
FIG. 23 is the first half of a sequence diagram illustrating an exemplary procedure for device information acquisition processing.
Figure 24:
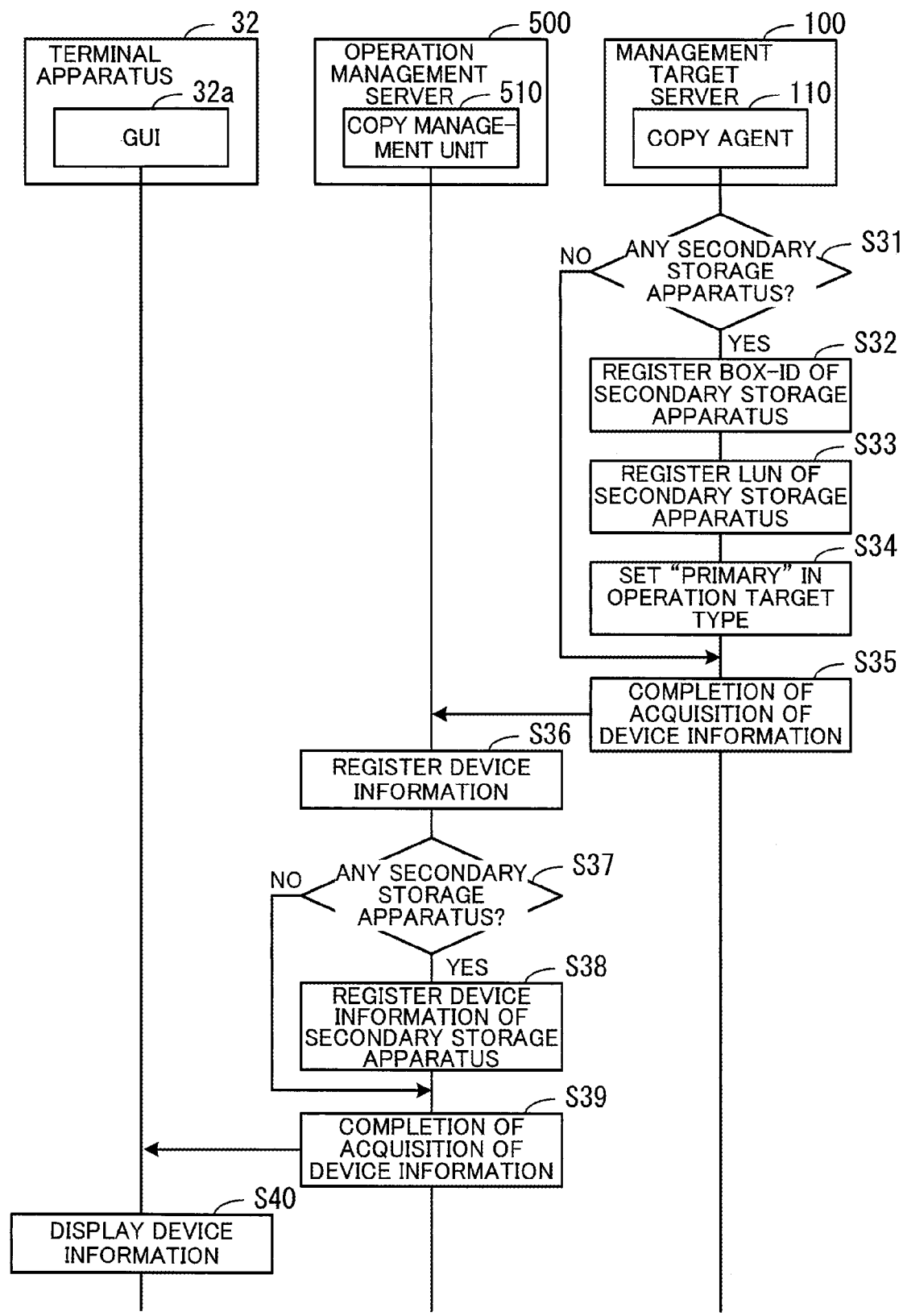
FIG. 24 is the second half of the sequence diagram illustrating the exemplary procedure for device information acquisition processing.

Next, a procedure for a copy operation will be described in detail. Before a copy operation is performed, device information acquisition processing and copy pair registration processing are performed. FIG. 23 is the first half of a sequence diagram illustrating an exemplary procedure for the device information acquisition processing. When a user inputs an instruction for acquiring device information to the terminal apparatus 32, the GUI 32a transmits a device information acquisition instruction to the operation management server 500 (step S11). Next, the copy management unit 510 in the operation management server 500 forwards the device information acquisition instruction acquired from the terminal apparatus 32 to the management target server 100 (step S12). For example, the copy management unit 510 refers to the node information table 512, recognizes the IP addresses of the management target servers 100 and 200, and transmits the device information acquisition instruction to each of the management target servers 100 and 200. In FIGS. 23 and 24, illustration of the device information acquisition processing performed by the management target server 200 is omitted.

In response to the device information acquisition instruction transmitted from the operation management server 500, the copy agent 110 in the management target server 100 notifies the ETL 120 of the device information acquisition instruction (step S13). In response to the device information acquisition instruction, the ETL 120 performs Box-ID acquisition processing (step S14). In the Box-ID acquisition processing, a Box-ID acquisition request is transmitted to each of the storage apparatuses 300 and 400. In response to the Box-ID acquisition request, the control units 350 and 450 in the respective storage apparatuses 300 and 400 transmit their own Box-IDs (steps S15 and S16) to the ETL 120. In addition, in response to the device information acquisition instruction, the ETL 120 performs LUN acquisition processing (step S17). In the LUN acquisition processing, a LUN acquisition request is transmitted to each of the storage apparatuses 300 and 400. In response to the LUN acquisition request, the control units 350 and 450 in the respective storage apparatuses 300 and 400 transmit the LUNs and the device names of their own internal storage devices (steps S18 and S19). The ETL 120 transmits the acquired Box-IDs, LUNs, and device names to the copy agent 110.

Next, the copy agent 110 transmits a TFO information acquisition instruction to the ETL 120 (step S20). The ETL 120 acquires TFO information in response to the TFO information acquisition instruction (step S21). In the TFO information acquisition processing, the ETL 120 transmits a TFO information acquisition request to each of the storage apparatuses 300 and 400. The control units 350 and 450 of the respective storage apparatuses 300 and 400 transmit information about their own TFO types (Primary or Secondary) in response to the TFO information acquisition requests, respectively (steps S23 and S24). The TFO types are stored in advance in the memories in the storage apparatuses 300 and 400, respectively. The ETL 120 transmits the acquired TFO information to the copy agent 110.

Next, the copy agent 110 registers the Box-ID acquired first in the TFO information table 111 (step S25). For example, the copy agent 110 registers the Box-ID of the storage apparatus that has transmitted "Primary" as its TFO information in an entry under the column "Primary_Box-ID." In addition, the copy agent 110 registers the LUN and the device name acquired first in the device information table 112 (step S26). For example, the copy agent 110 registers a device name and a LUN of the storage apparatus that has transmitted "Primary" as its TFO information in entries under the columns "Device name" and "Primary_LUN," respectively.

FIG. 24 is the second half of the sequence diagram illustrating the exemplary procedure for the device information acquisition processing. The copy agent 110 determines whether any storage apparatus has transmitted "Secondary" as its TFO information (step S31). If no storage apparatus has transmitted "Secondary," the copy agent 110 determines that TFO has not been executed. Thus, the processing proceeds to step S35. If a storage apparatus has transmitted "Secondary," the copy agent 110 determines that TFO has been executed. Thus, the processing proceeds to step S32.

The copy agent 110 registers the Box-ID of the storage apparatus that has transmitted "Secondary" as its TFO information in an entry under the column "Secondary_Box-ID" in the TFO information table 111 (step S32). Next, the copy agent 110 registers a device name and a LUN of the storage apparatus that has transmitted "Secondary" as its TFO information in entries under the columns "Device name" and "Secondary_LUN," respectively, in the device information table 112 (step S33). In addition, the copy agent 110 sets "Primary" in an entry under the column "Operation target type" in the TFO information table 111 (step S34). Next, the copy agent 110 transmits a response indicating completion of acquisition of the device information to the operation management server 500, along with the acquired device information (step S35).

When receiving the device information, the copy management unit 510 in the operation management server 500 registers the device information about the first storage apparatus (Primary) in the TFO information table 513, the device information table 514, and the copy pair information table 515 (step S36). This processing is the same as that performed by the copy agent 110 described in steps S25 and S26 in FIG. 23.

The copy management unit 510 determines whether any storage apparatus has transmitted "Secondary" as its own TFO information (step S37). If no storage apparatus has transmitted "Secondary," the copy management unit 510 determines that no TFO has been executed. Thus, the processing proceeds to step S39. If a storage apparatus has transmitted "Secondary," the copy management unit 510 determines that TFO has been executed. Thus, the processing proceeds to step S38.

If the storage apparatus has been substituted after TFO, the copy management unit 510 registers the device information of the storage apparatus that has transmitted "Secondary" (step S38). The device information is registered in the box information table 511, the TFO information table 513, the device information table 514, and the copy pair information table 515. Next, the copy management unit 510 transmits a response indicating completion of acquisition of the device information to the terminal apparatus 32, along with the acquired device information (step S39). The GUI 32*a* of the terminal apparatus 32 displays the received device information on a monitor (step S40).

Figure 25:
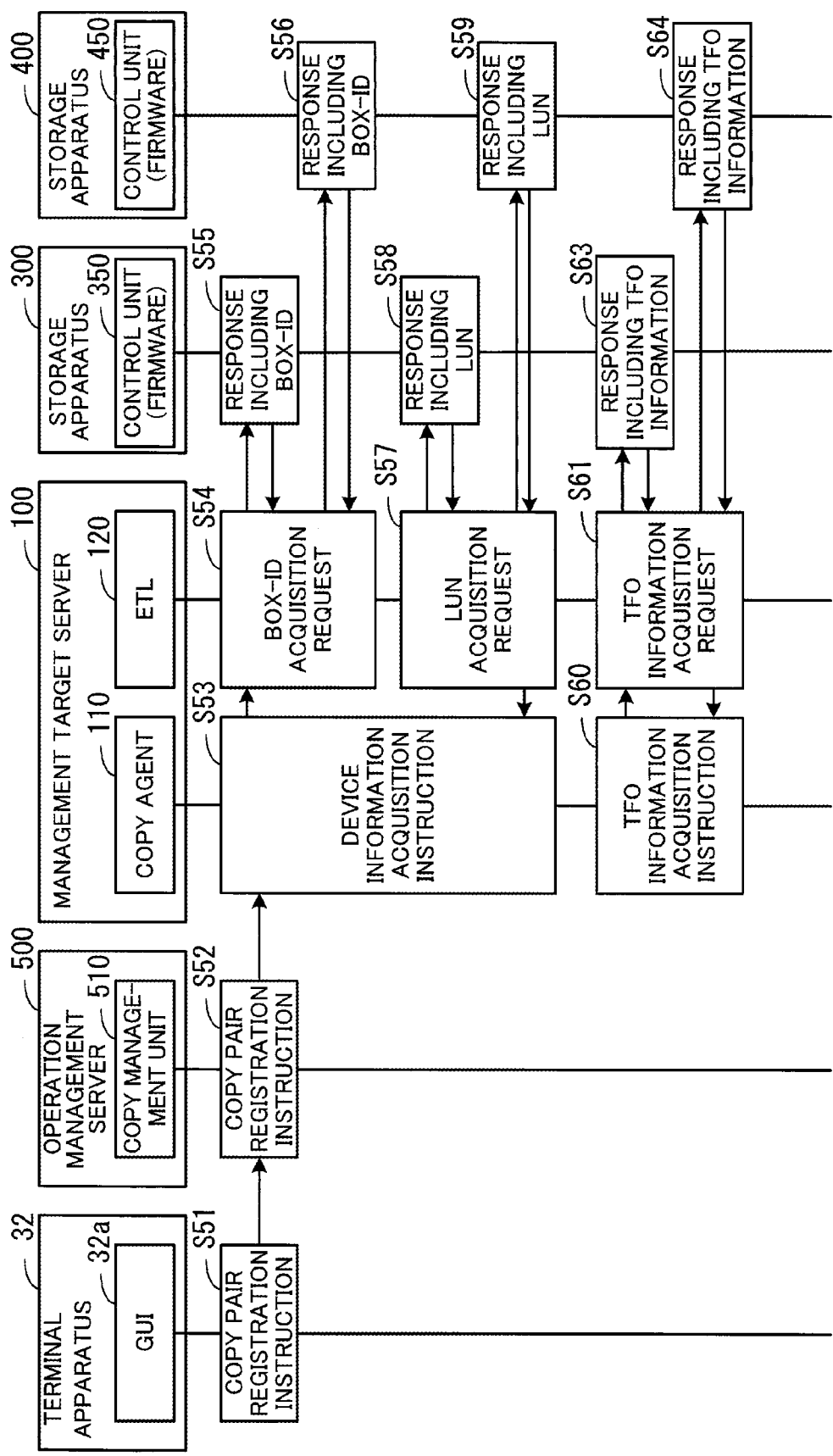
FIG. 25 is the first half of a sequence diagram illustrating an exemplary procedure for copy pair registration processing.
Figure 26:
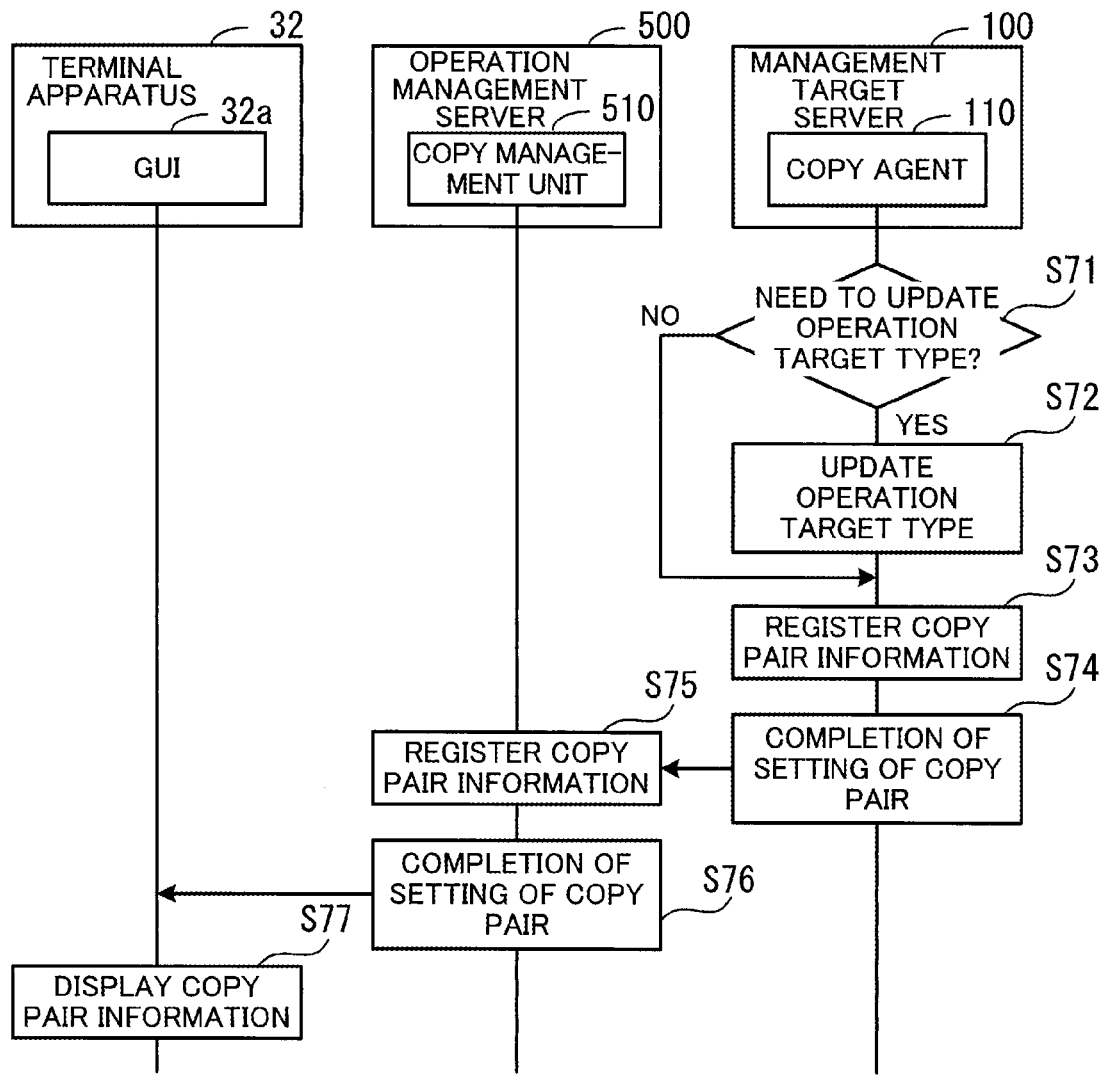
FIG. 26 is the second half of the sequence diagram illustrating the exemplary procedure for copy pair registration processing.

Next, the copy pair registration processing will be described in detail. FIG. 25 is the first half of a sequence diagram illustrating an exemplary procedure for copy pair registration processing. When a user inputs an instruction for registering a copy pair to the terminal apparatus 32, the GUI 32*a* transmits a copy pair registration instruction to the operation management server 500 (step S51). The copy management unit 510 in the operation management server 500 forwards the copy pair registration instruction acquired from the terminal apparatus 32 to the management target server 100 (step S52). For example, the copy management unit 510 refers to the node information table 512, recognizes the IP addresses of the management target servers 100 and 200, and transmits the copy pair registration instruction to each of the management target servers 100 and 200. In FIGS. 25 and 26, illustration of the copy pair registration processing performed by the management target server 200 is omitted.

When receiving the copy pair registration instruction, the copy agent 110 in the management target server 100 performs volume information acquisition processing and TFO information acquisition processing (steps S53 to S60). The volume information acquisition processing and the TFO information acquisition processing are the same as those described in steps S13 to S24 in FIG. 23.

FIG. 26 is the second half of the sequence diagram illustrating the exemplary procedure for the copy pair registration processing. The copy agent 110 in the management target server 100 determines whether to update the operation target type (step S71). For example, when the operation target type currently set in the TFO information table 111 is "Primary," if the copy agent 110 receives device information only from a storage apparatus whose operation target type is "Secondary," the copy agent 110 determines that the operation target type needs to be updated. If the copy agent 110 updates the operation target type, the processing proceeds to step S72. If the copy agent 110 does not update the operation target type, the processing proceeds to step S73.

The copy agent 110 updates the operation target type in the TFO information table 111 (step S72). For example, when the copy agent 110 acquires device information only from a storage apparatus whose operation target type is "Secondary," the copy agent 110 sets the operation target type to "Secondary." In contrast, when the copy agent 110 acquires device information from the storage apparatus whose operation target type is "Primary," the copy agent 110 sets the operation target type to "Primary."

The copy agent 110 registers copy pair information such as the device IDs and the node IDs of the copy-source and copy-destination storage apparatuses in the copy pair information table 113 (step S73). Next, the copy agent 110 notifies the operation management server 500 of completion of setting of the copy pair along with the copy pair information (step S74).

The copy management unit 510 in the operation management server 500 registers the copy pair information such as the device IDs and the IDs of the copy-source and the copy-destination storage devices in the copy pair information table 515 (step S75). Next, the copy management unit 510 notifies the terminal apparatus 32 of the copy pair information and of completion of the setting of the copy pair (step S76). The terminal apparatus 32 displays the copy pair information on a monitor (step S77).

Figure 27:
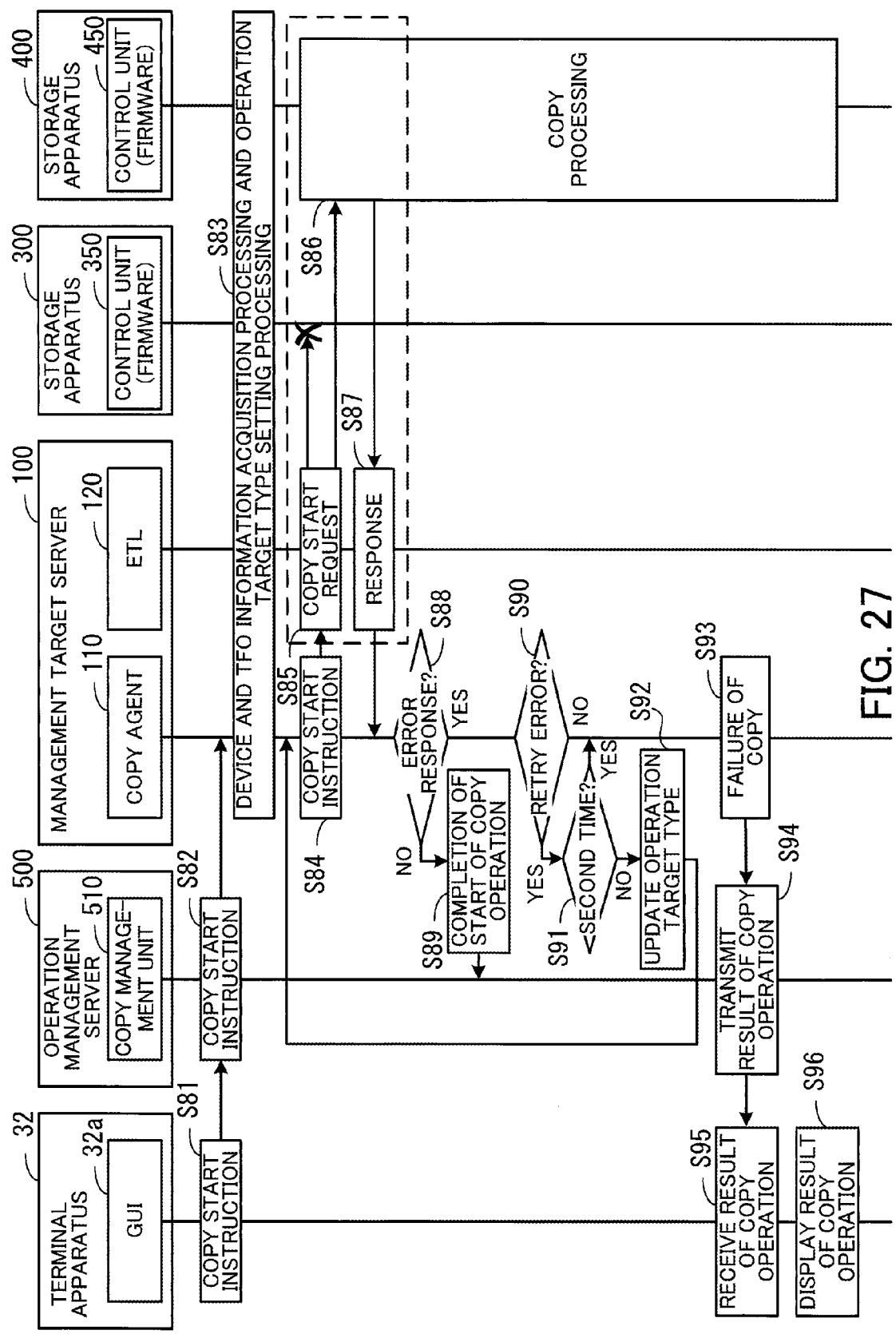
FIG. 27 is a sequence diagram illustrating an exemplary procedure for copy operation processing.

Next, copy operation processing will be described in detail. FIG. 27 is a sequence diagram illustrating an exemplary procedure for copy operation processing. First, for example, a user inputs an instruction for starting a copy operation in which device names are specified to the terminal apparatus 32, the GUI 32*a* transmits a copy start instruction to the operation management server 500 (step S81). The copy management unit 510 in the operation management server 500 forwards the copy start instruction acquired from the terminal apparatus 32 to the management target server 100 that operates the corresponding devices (step S82).

When receiving the copy start instruction, the management target server 100 performs device information acquisition processing, TFO information acquisition processing, and operation target type setting processing in coordination with the storage apparatuses 300 and 400 (step S83). Details of the processing are the same as those described with reference to steps S53 to S64 in FIG. 25 and steps S71 and S72 in FIG. 26.

The copy agent 110 transmits a copy start instruction including the operation target type to the ETL 120 (step S84). For example, the copy agent 110 includes the operation target type, set under the column "Operation target type" in the TFO information table 111, in the copy start instruction. When transmitting the copy start instruction, the copy agent 110 refers to the device information table 112, converts the device names specified in the copy start instruction into the respective LUNs, and specifies the copy-source and copy-destination storage devices by the respective LUNs.

The ETL 120 transmits a copy start request in which the copy-source and copy-destination storage devices are specified by the respective LUNs (step S85). The copy start request is transmitted to the storage apparatus 300 or 400 via a path that is set "Active" at this point. For example, if the storage apparatus 300 has properly been operating as the "Primary" storage apparatus and if this storage apparatus 300 malfunctions immediately after the copy start instruction is transmitted, the copy start request is transmitted to the storage apparatus 300 before completion of TFO. However, in this case, a positive response is not transmitted from the storage apparatus 300. Thus, the ETL 120 retries transmission of the copy start request. As a result of the retry performed after completion of the TFO, the copy start request is transmitted to the storage apparatus 400.

When receiving the copy start request, the control unit 450 in the storage apparatus 400 compares the operation target type specified in the copy start request with its own operation target type. If the operation target types match, the control unit 450 performs data copy processing (step S86). If the operation target types match, the control unit 450 transmits a positive response indicating the start of the copy processing to the management target server 100. On the other hand, if the operation target types do not match, the control unit 450 transmits a retry error indicating a type error to the management target server 100, instead of performing copy processing. The retry error indicating a type error also serves as a notification of execution of the TFO.

The ETL 120 in the management target server 100 receives the response from the storage apparatus 400 and forwards the response to the copy agent 110 (step S87). The copy agent 110 determines that the response is an error response (step S88). If so, the processing proceeds to step S90. If the response is a positive response, the processing proceeds to step S89.

If the response received by the ETL 120 is a positive response, the copy agent 110 transmits the response indicating completion of the start of the copy to the operation management server 500 (step S89).

If the response received by the ETL 120 is an error response, the copy agent 110 determines whether the error response is a retry error or another error (step S90). If the error response is a retry error, the processing proceeds to step S91. If the error response is another error, the processing proceeds to step S93.

If the error response is a retry error, the copy agent 110 determines whether the retry error is the second retry error (step S91). If the error response is the first retry error, the processing proceeds to step S92. If the error response is the second retry error, the processing proceeds to step S93 to end the copy start operation.

If the error response is the first retry error, the copy agent 110 updates the operation target type in the TFO information table 111 to "Secondary" (step S92). Next, the processing proceeds to step S85. If the ETL 120 receives an error response other than a retry error or receives the second retry error, the copy agent 110 transmits a response indicating a copy failure to the operation management server 500 (step S93).

The copy management unit 510 in the operation management server 500 transmits a copy operation completion response indicating completion of the start or the failure of the copy operation to the terminal apparatus 32 (step S94). The GUI 32a in the terminal apparatus 32 receives the response indicating completion of the copy operation (step S95). Next, the GUI 32a displays the result of the copy operation on a copy status check screen (step S96). In this way, a copy start operation is performed.

Figure 28:
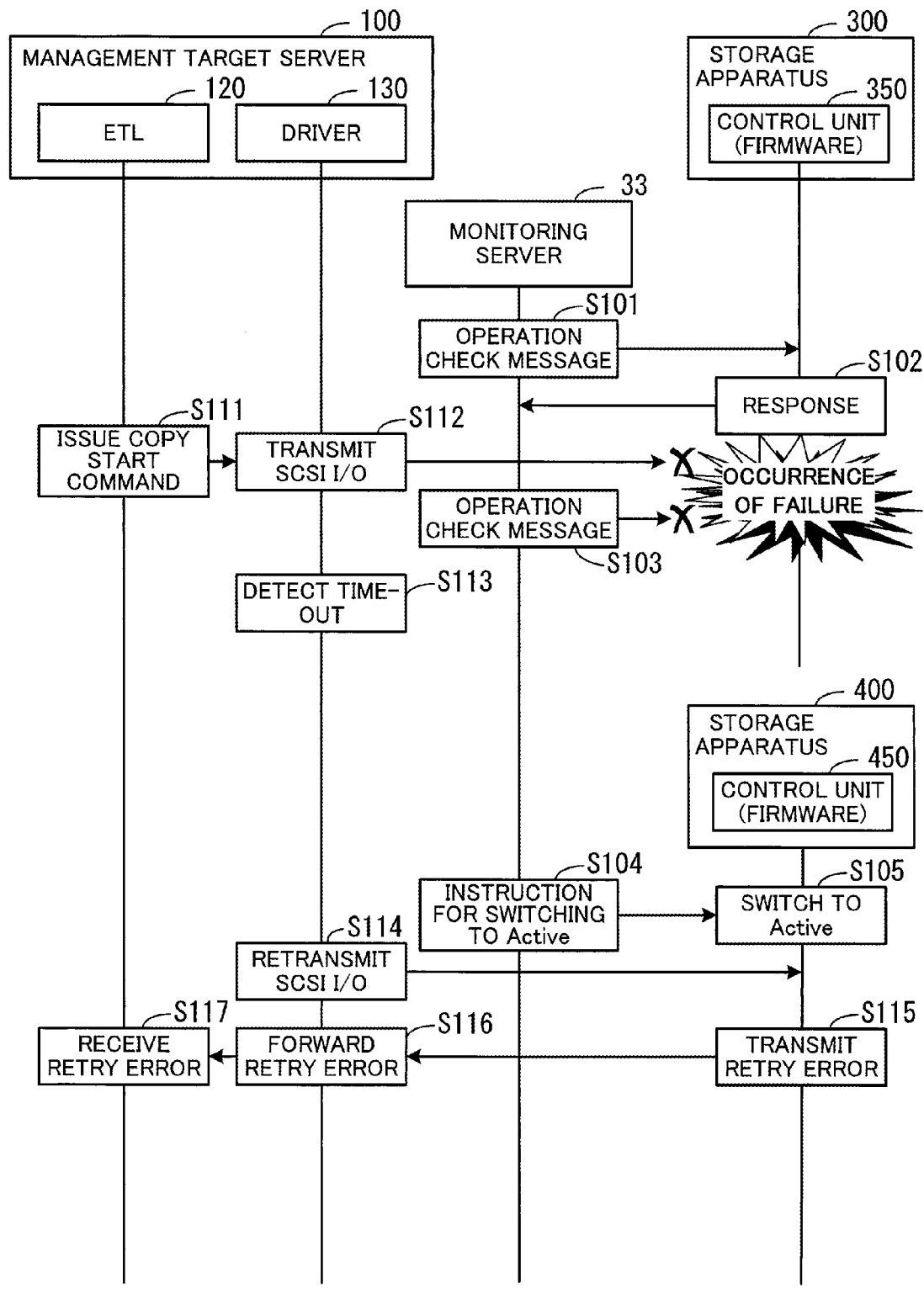
FIG. 28 is a sequence diagram illustrating details of processing preformed when TFO is executed.

Next, the coordination processing among the management target server 100, the storage apparatuses 300 and 400, and the monitoring server 33 performed when TFO is executed will be described with reference to FIG. 28. FIG. 28 is a sequence diagram illustrating details of processing preformed when TFO is executed. The monitoring server 33 transmits an operation check message to the storage apparatus 300 (step S101). As long as properly operating, the control unit 350 in the storage apparatus 300 returns a response in response to a message from the monitoring server 33 (step S102). However, after the storage apparatus 300 malfunctions, the storage apparatus 300 cannot return a response in response to an operation check message from the monitoring server 33 (step S103). In this way, the monitoring server 33 recognizes that the storage apparatus 300 is malfunctioning. Consequently, the monitoring server 33 instructs the storage apparatus 400 to switch to and function as the "Active" storage apparatus (step S104). Instructed by the monitoring server 33, the control unit 450 in the storage apparatus 400 switches its operation status to "Active" (step S105). In this way, TFO is executed.

When receiving a copy operation instruction during such TFO processing, the ETL 120 in the management target server 100 transmits an SCSI command for starting a copy operation (step S111). The driver 130 forwards the transmitted SCSI command to the storage apparatus 300 as an SCSI I/O request (step S112). If the storage apparatus 300 is already malfunctioning at this point, the storage apparatus 300 cannot respond. Thus, the driver 130 detects time-out (step S113)

When detecting time-out, the driver 130 retries transmission of the same SCSI I/O request (step S114). If TFO has already been completed at this point, the transmitted request is received by the storage apparatus 400. The storage apparatus 400 performs copy start processing. In the copy start processing, the storage apparatus 400 compares the operation target types and determines that the received operation target type is different from its own operation target type. Accordingly, the control unit 450 transmits a retry error indicating that the operation target type is different (TFO has been executed) to the management target server 100 (step S115).

The driver 130 in the management target server 100 receives the retry error from the storage apparatus 400 and forwards the retry error to the ETL 120 (step S116). The ETL 120 receives the retry error forwarded by the driver 130 (step S117).

In this way, when the storage apparatus 300 malfunctions, TFO is executed under the control of the monitoring server 33. The monitoring server 33 controls the storage apparatuses 300 and 400. However, for example, the monitoring server 33 does not notify the management target server 100 of execution of TFO. Namely, the management target server 100 recognizes execution of TFO by receiving a retry error.

Next, a procedure for copy start processing performed by the storage apparatus 400 will be described.

Figure 29:
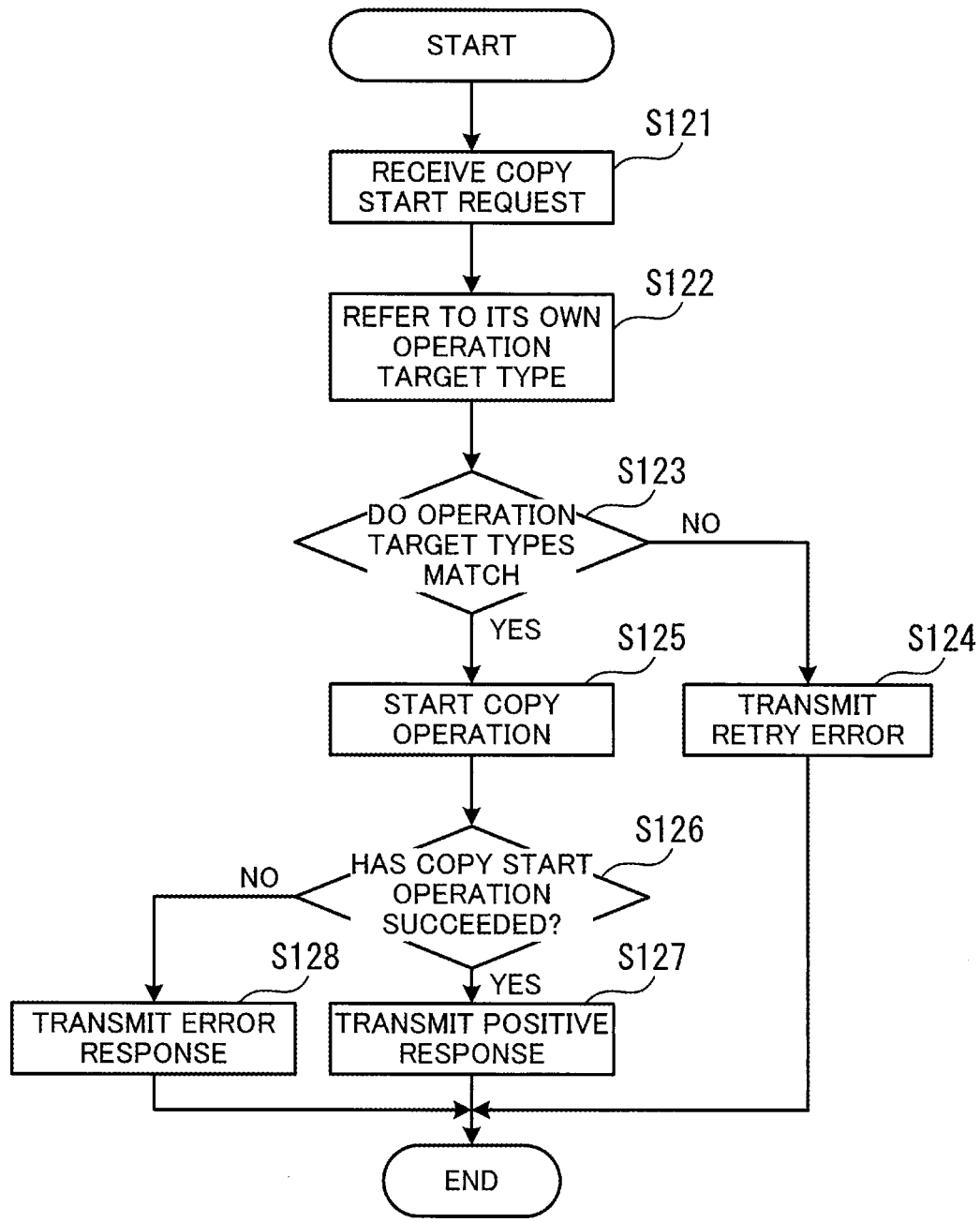
FIG. 29 is a flowchart illustrating an exemplary procedure for copy start processing.

FIG. 29 is a flowchart illustrating an exemplary procedure for the copy start processing.

[step S121] The control unit 450 receives a copy start request.

[step S122] The control unit 450 refers to the operation target type of the storage apparatus 400 set by the monitoring server 33.

[step S123] The control unit 450 compares the operation target type specified in the copy start request with its own operation target type and determines whether the operation target types match. If the operation target types match, the processing proceeds to step S125. If not, the processing proceeds to step S124.

[step S124] If the operation target types do not match, the control unit 450 transmits a retry error to the management target server 100, and the copy start processing is ended.

[step S125] If the operation target types match, the control unit 450 starts a copy operation in accordance with the copy start request.

[step S126] The control unit 450 determines whether the copy start operation has succeeded. For example, if the copy-source and copy-destination storage devices properly operate and copying data properly proceeds, the control unit 450 determines that the copy start operation has succeeded. In contrast, for example, data cannot be copied because of a malfunction of any one of the storage devices or a lack of capacity, the control unit 450 determines that the copy start operation has failed. If the copy start operation has succeeded, the processing proceeds to step S127. If not, the processing proceeds to step S128.

[step S127] The control unit 450 transmits a positive response to the management target server 100, and the copy start processing is ended.

[step S128] The control unit 450 transmits an error response other than a retry error to the management target server 100, and the copy start processing is ended. As described above, according to the second embodiment, information that identifies an operation target box is added to a copy operation request. If the storage apparatus 400 receiving the copy operation request determines that the storage apparatus 400 is not the operation target, the storage apparatus 400 does not perform the operation but transmits a retry error in response. In this way, the management target server 100 recognizes that failover has been executed.

In addition, the management target server 100 previously stores LUNs of TFO-volume copy pairs in both of the "Active" and "Standby" storage apparatuses. Thus, when failover is executed, the specified LUNs are promptly changed to those in the substituting storage apparatus, and the copy operation request is output again. As a result, when a copy operation instruction is output, even when TFO is executed, accurate LUNs are specified and the substituting storage apparatus executes a copy operation.

In an aspect, a data operation is enabled by specifying accurate storage devices even after TFO.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus connected to a first storage apparatus of a first type and a second storage apparatus of a second type, which takes over an operation request directed to the first storage apparatus when transparent failover is executed, via a network, the information processing apparatus comprising:
   an interface unit that is connected to the network; and
   a processor that performs a procedure including:
   adding type information indicating the first type in a first operation request in which operation target storage devices are specified by unique identifiers, respectively, used in the first storage apparatus and outputting the first operation request to the first storage apparatus through the network via the interface unit, and
   adding, when the processor transmits the first operation request to the second storage apparatus and receives an error response indicating a type error from the second storage apparatus after transparent failover is executed, type information indicating the second type in a second operation request in which operation target storage devices are specified by unique identifiers, respectively, used in the second storage apparatus and outputting the second operation request to the second storage apparatus through the network via the interface unit.

2. The information processing apparatus according to claim 1, further comprising:
   a memory that stores a device information table in which device names, the identifiers of the storage devices in the first storage apparatus, the identifiers being associated with corresponding device names, and the identifiers of the storage devices in the second storage apparatus, the identifiers being associated with corresponding device names, are set,
   wherein, in the outputting of the first operation request, on the basis of an operation instruction in which device names are specified, the processor refers to the device information table and recognizes identification information of the operation target storage devices in the first storage apparatus, the identification information corresponding to the device names specified in the operation instruction, and
   wherein, in the outputting of the second operation request, the processor refers to the device information table and recognizes identification information of the operation target storage devices in the second storage apparatus, the identification information corresponding to the device names specified in the operation instruction.

3. The information processing apparatus according to claim 1, wherein each of the first and second operation requests is a copy request in which a copy-source storage device and a copy-destination storage device are specified.

4. A storage system comprising:
   a first storage apparatus of a first type;
   a second storage apparatus of a second type, which takes over an operation request directed to the first storage apparatus when transparent failover is executed; and
   an information processing apparatus,
   wherein the first storage apparatus, the second storage apparatus, and the information processing apparatus are connected to each other via a network,
   wherein the information processing apparatus adds type information indicating the first type in a first operation request in which operation target storage devices are specified by unique identifiers, respectively, used in the first storage apparatus and outputs the first operation request to the first storage apparatus through the network,
   wherein, when the information processing apparatus transmits the first operation request to the second storage apparatus and receives an error response indicating a type error from the second storage apparatus after transparent failover is executed, the information processing apparatus adds type information indicating the second type in a second operation request in which operation target storage devices are specified by unique identifiers, respectively, used in the second storage apparatus and outputs the second operation request to the second storage apparatus through the network,
   wherein, when receiving the first operation request, the first storage apparatus operates data in accordance with the first operation request,
   wherein, when receiving the first or second operation request, the second storage apparatus compares the type indicated in the type information included in the first or second operation request with the type of the second storage apparatus, and
   wherein, when the types match, the second storage apparatus operates data in accordance with the received first or second operation request and when the types do not match, the second storage apparatus transmits an error response indicating a type error to the information processing apparatus.

5. A non-transitory computer-readable recording medium storing a computer program that causes a computer, which is connected to a first storage apparatus of a first type and a second storage apparatus of a second type, which takes over an operation request directed to the first storage apparatus when transparent failover is executed, via a network, to perform a procedure comprising:
   adding type information indicating the first type in a first operation request in which operation target storage devices are specified by unique identifiers, respectively, used in the first storage apparatus and outputting the first operation request to the first storage apparatus through the network, and
   adding, when the computer transmits the first operation request to the second storage apparatus and receives an error response indicating a type error from the second storage apparatus after transparent failover is executed, type information indicating the second type in a second operation request in which operation target storage devices are specified by unique identifiers, respectively, used in the second storage apparatus and outputting the second operation request to the second storage apparatus through the network.

\* \* \* \* \*